(12) United States Patent
Kusanagi

(10) Patent No.: US 9,743,000 B2
(45) Date of Patent: Aug. 22, 2017

(54) MOVING IMAGE PROCESSING APPARATUS, IMAGING APPARATUS, AND MOVING IMAGE PROCESSING METHOD

(71) Applicant: CANON KABUSHIKI KAISHA, Tokyo (JP)

(72) Inventor: Suguru Kusanagi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 431 days.

(21) Appl. No.: 14/248,753

(22) Filed: Apr. 9, 2014

(65) Prior Publication Data
US 2014/0313354 A1    Oct. 23, 2014

(51) Int. Cl.
    H04N 5/225    (2006.01)
    H04N 5/232    (2006.01)

(52) U.S. Cl.
    CPC ..... H04N 5/23267 (2013.01); H04N 5/23254 (2013.01); H04N 5/23261 (2013.01); H04N 5/23296 (2013.01)

(58) Field of Classification Search
    CPC ............ H04N 5/23267; H04N 5/2327; H04N 5/23274; H04N 5/23277; H04N 5/2329; H04N 5/23264; H04N 5/2328; G06T 7/0024; G06T 7/0038; G03B 2205/0007; G03B 2207/005; G02B 27/646
    See application file for complete search history.

(56) References Cited

U.S. PATENT DOCUMENTS

| | | | | |
|---|---|---|---|---|
| 2002/0063779 A1* | 5/2002 | Kaneda | ............... | H04N 5/23248 348/208.99 |
| 2005/0061952 A1* | 3/2005 | Kawahara | .......... | H04N 5/23248 250/208.1 |
| 2006/0017813 A1* | 1/2006 | Okubo | ............... | H04N 5/23274 348/208.2 |
| 2006/0262193 A1* | 11/2006 | Kumaki | ............. | H04N 5/23248 348/208.6 |
| 2007/0014432 A1* | 1/2007 | Tsunashima | .......... | G01S 3/7864 382/103 |
| 2007/0140529 A1* | 6/2007 | Iwabuchi | ................. | G06T 7/202 382/107 |
| 2008/0174663 A1* | 7/2008 | Iwabuchi | ........... | H04N 5/23248 348/208.6 |
| 2009/0096878 A1* | 4/2009 | Chen | ...................... | H04N 5/144 348/208.6 |

FOREIGN PATENT DOCUMENTS

JP           07-143380 A      6/1995

* cited by examiner

*Primary Examiner* — Twyler Haskins
*Assistant Examiner* — Dwight C Tejano
(74) *Attorney, Agent, or Firm* — Canon U.S.A., Inc. IP Division

(57) ABSTRACT

A moving image processing apparatus includes a shake amount acquisition unit configured to acquire and output a shake amount, a period acquisition unit configured to acquire a period during which a change in composition occurs in a video image, a setting unit configured to set a size and position of a cut-out range of image data for each frame of the video image based on the shake amount output from the shake amount acquisition unit, and a correction unit configured to change, based on the shake amount, the position of the cut-out range set by the setting unit in such a way as to correct shaking of the video image.

12 Claims, 24 Drawing Sheets

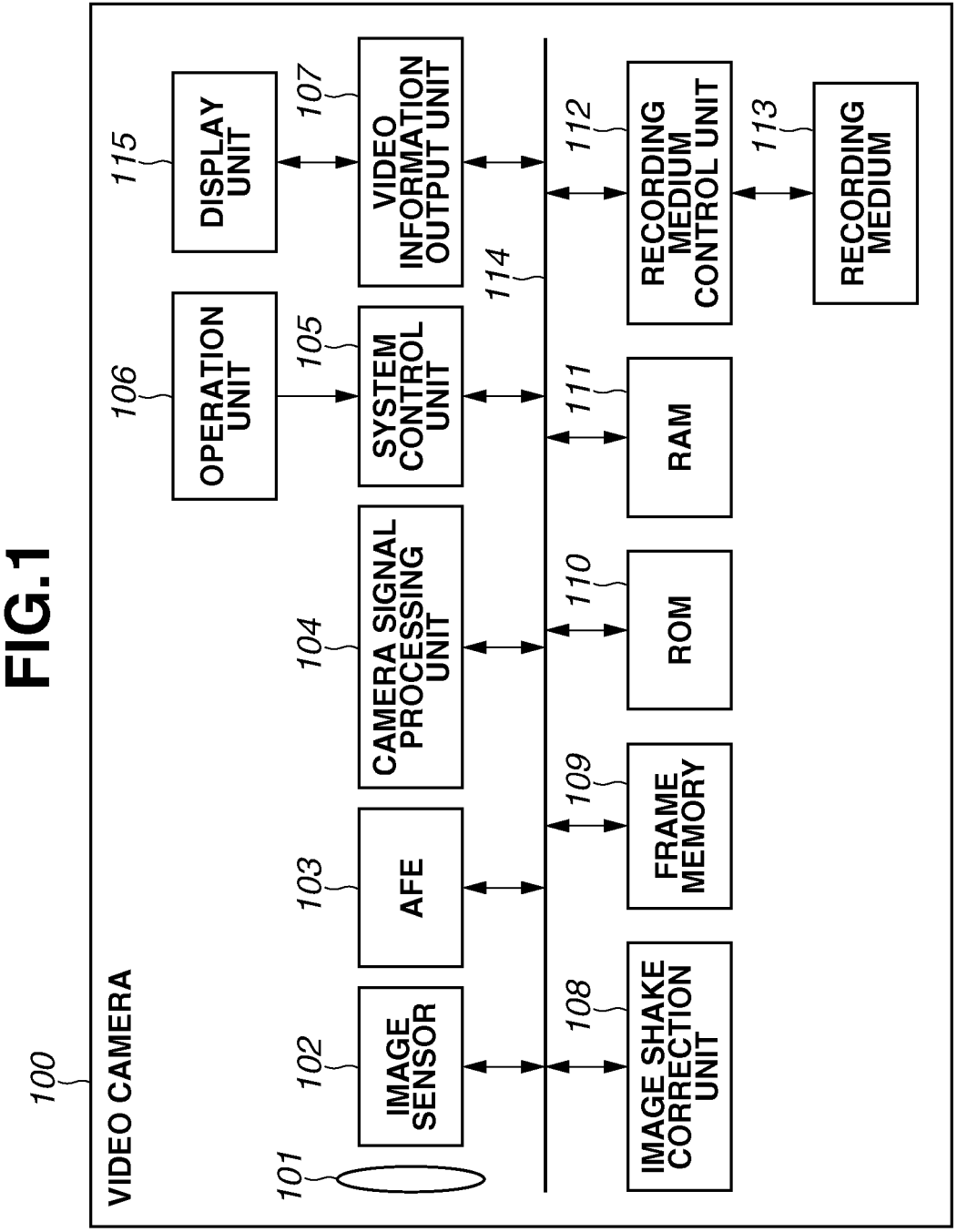

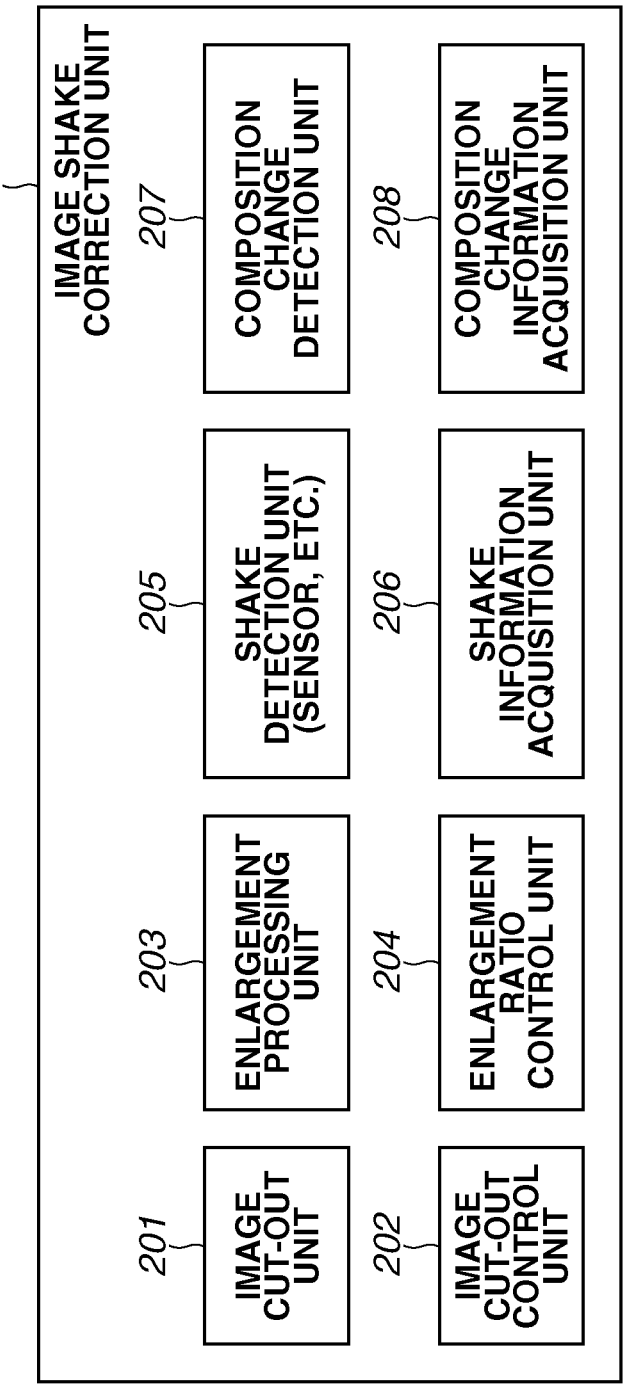

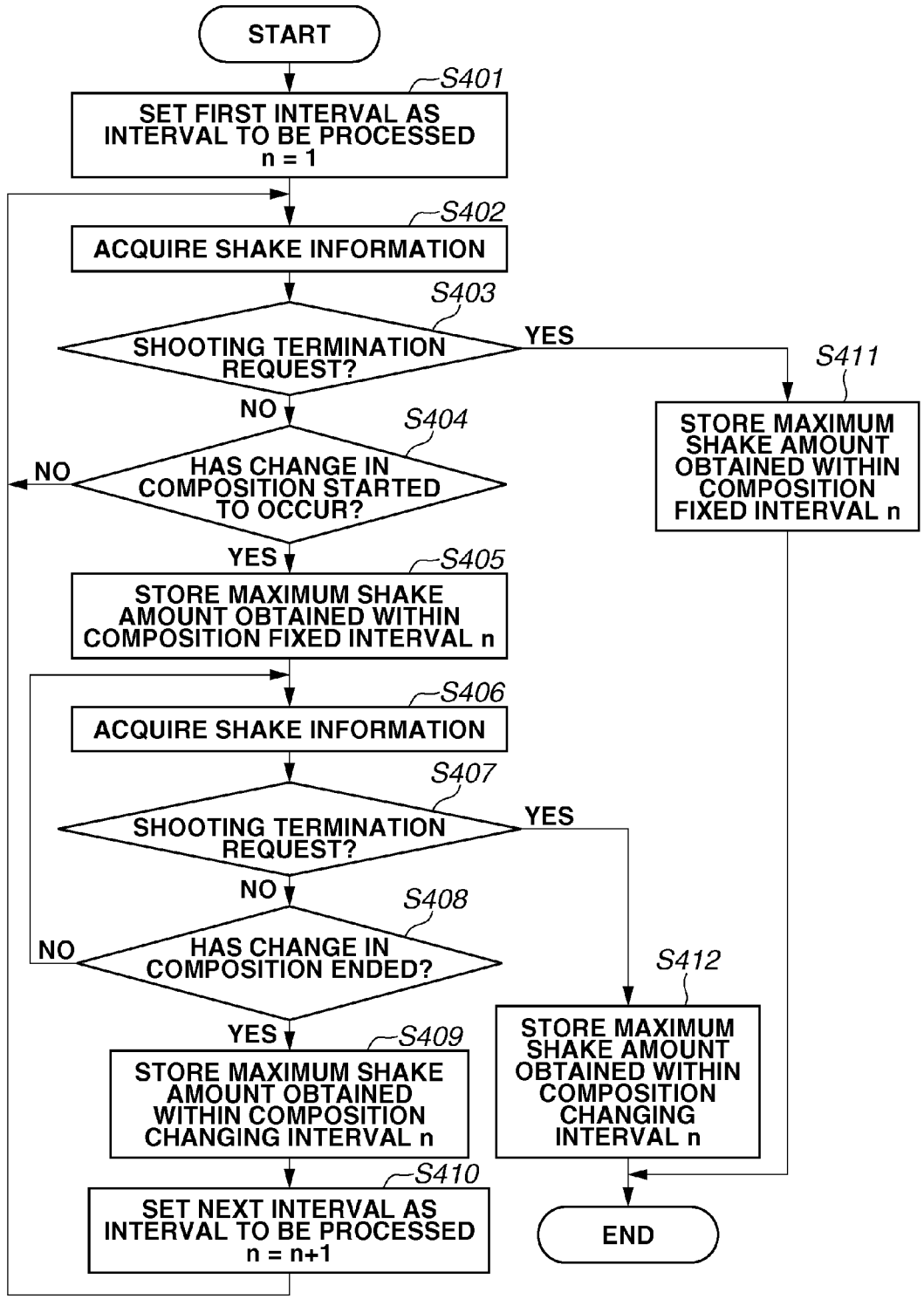

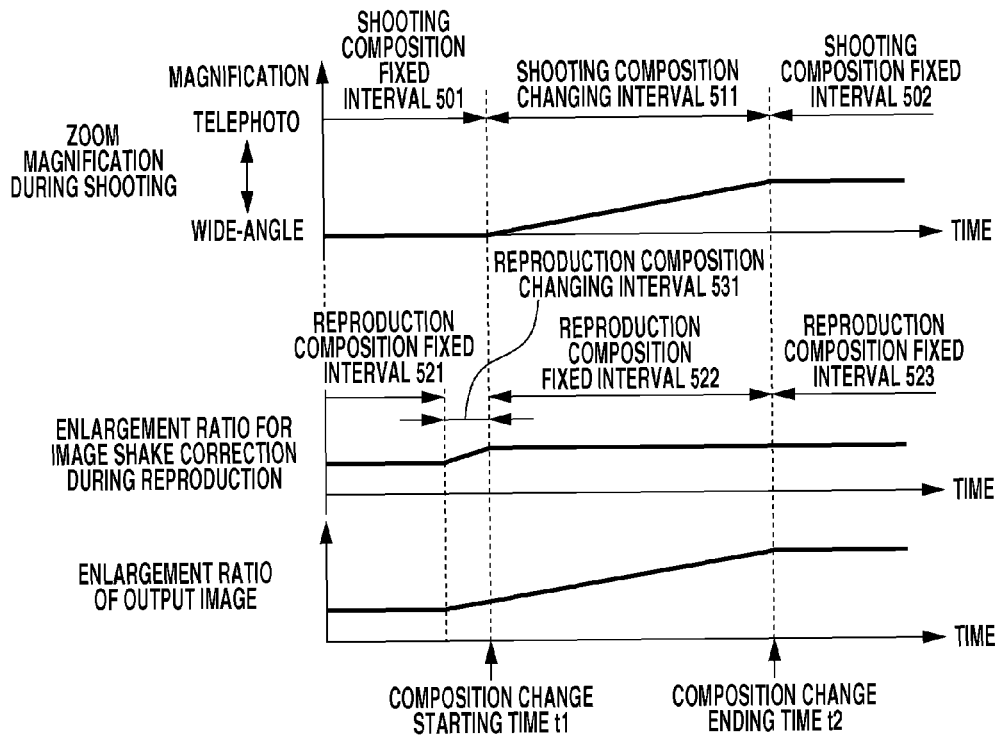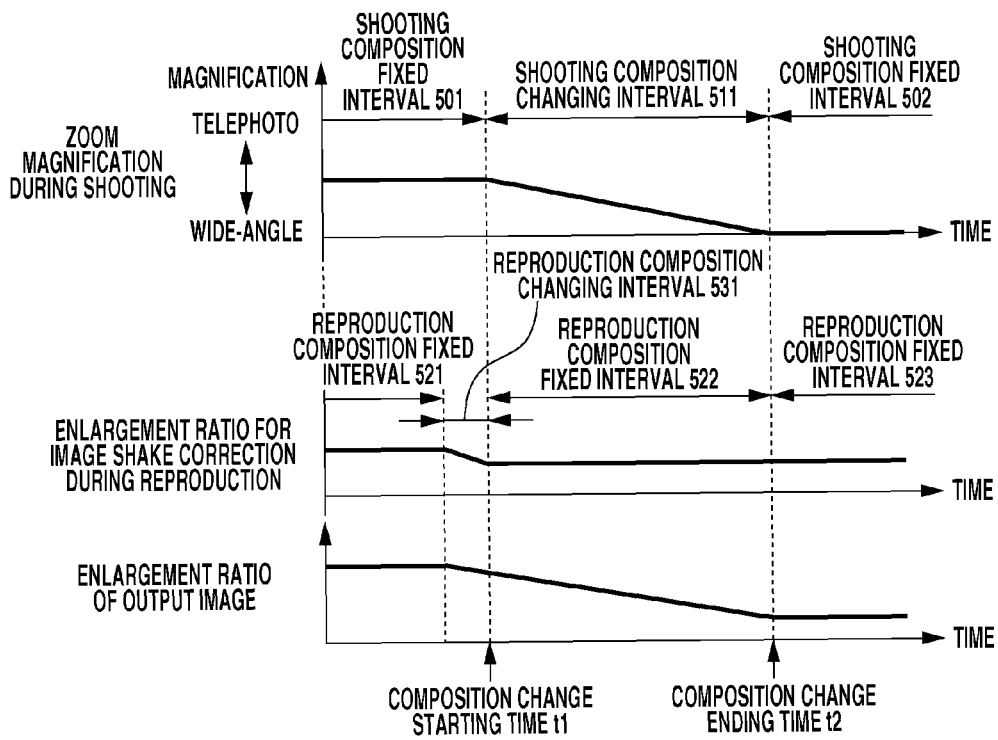

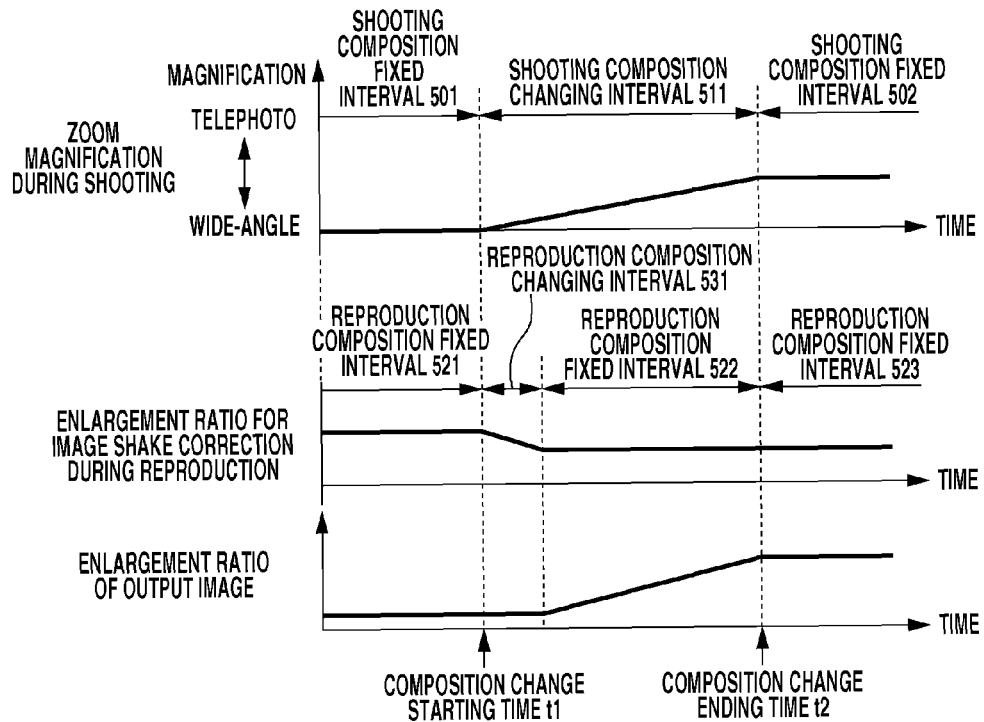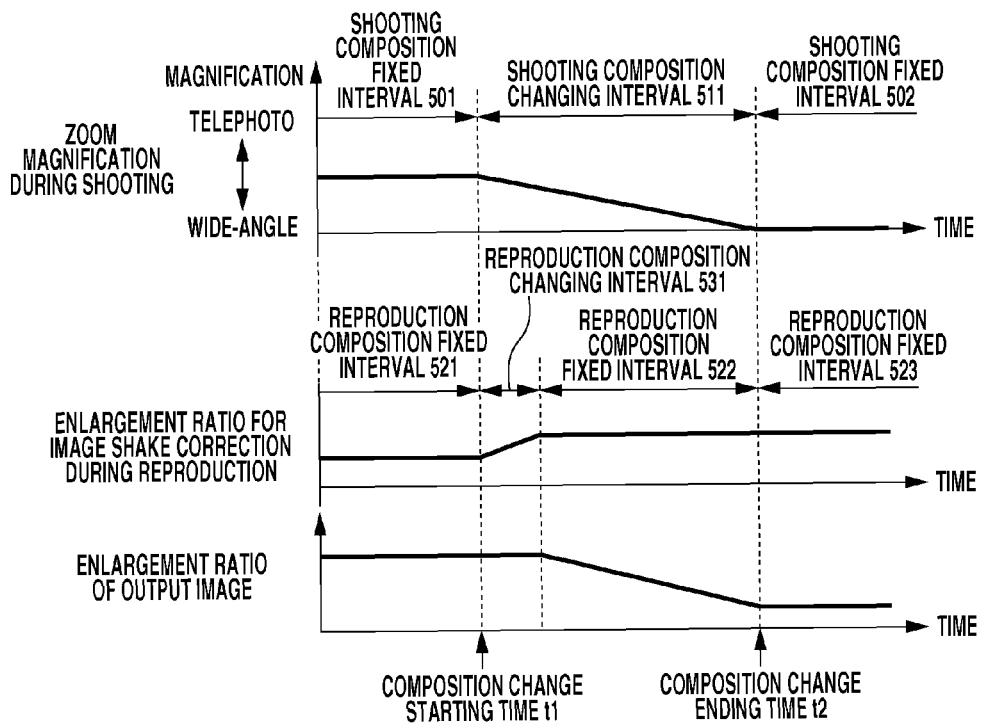

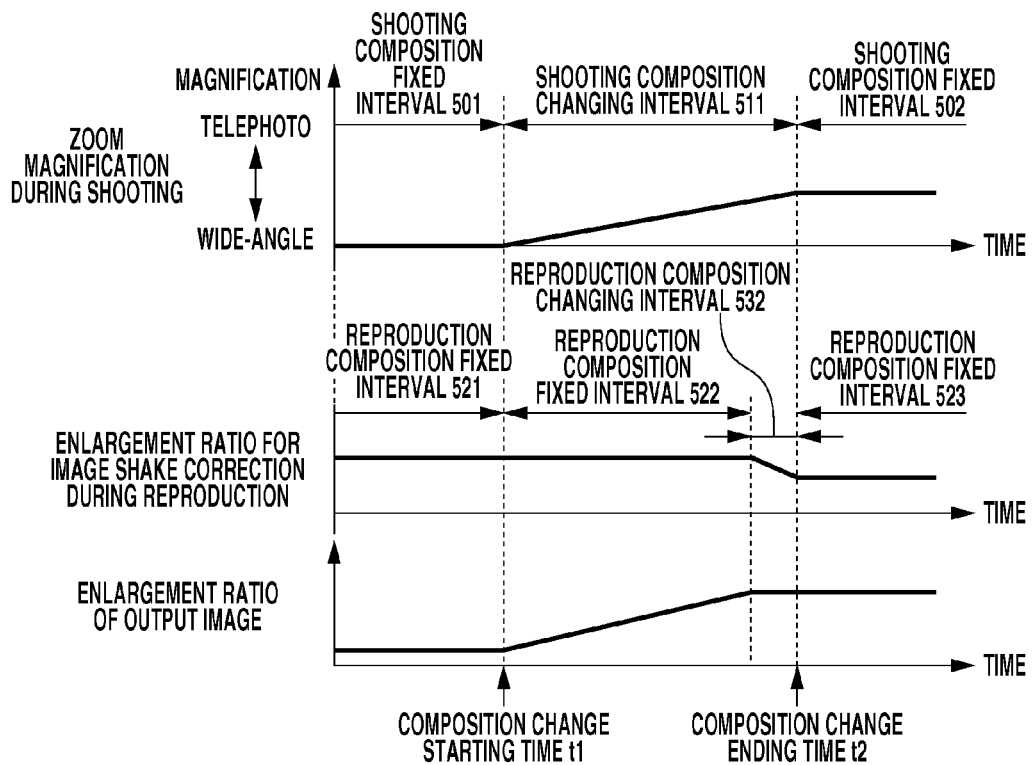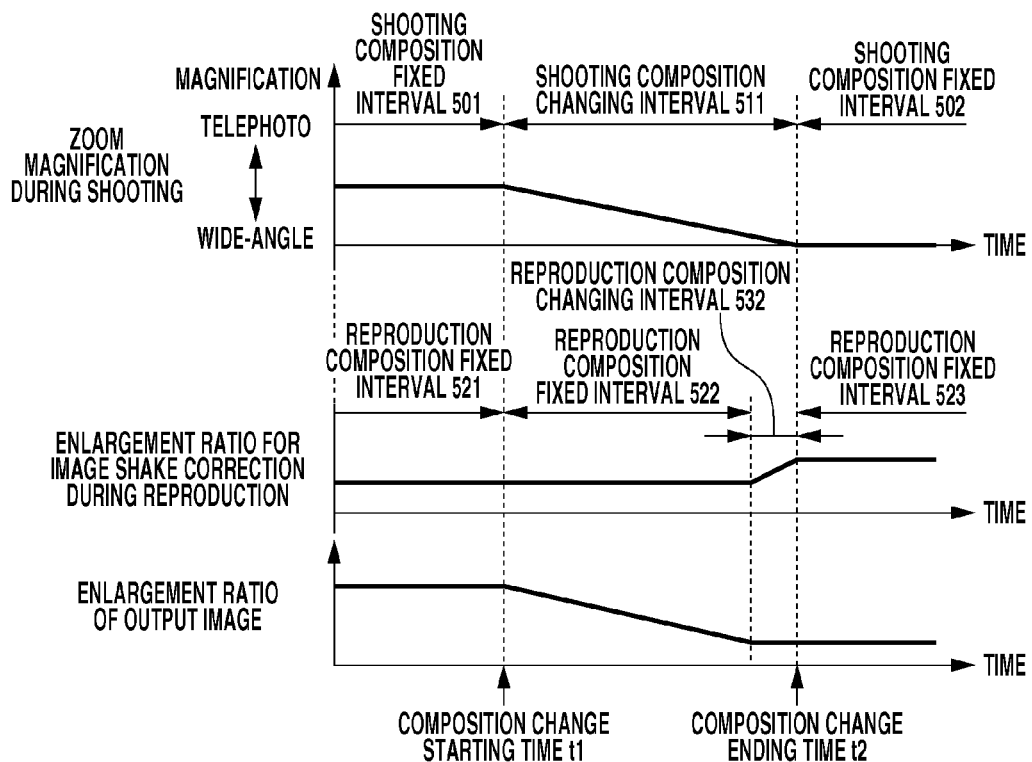

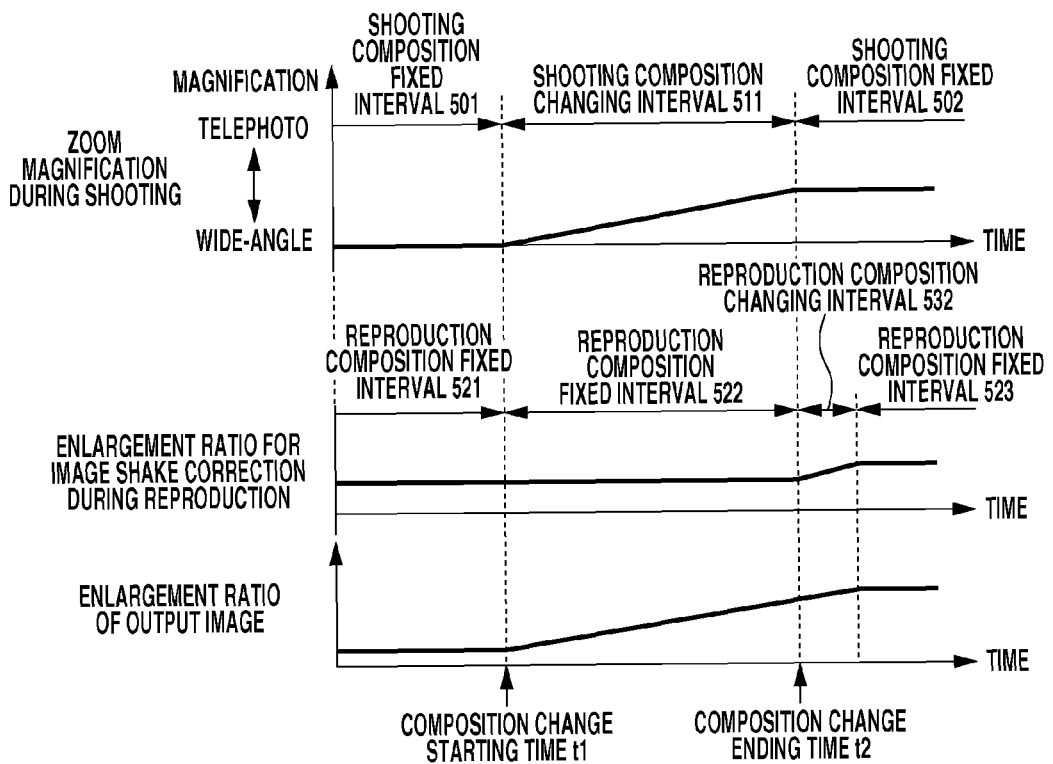
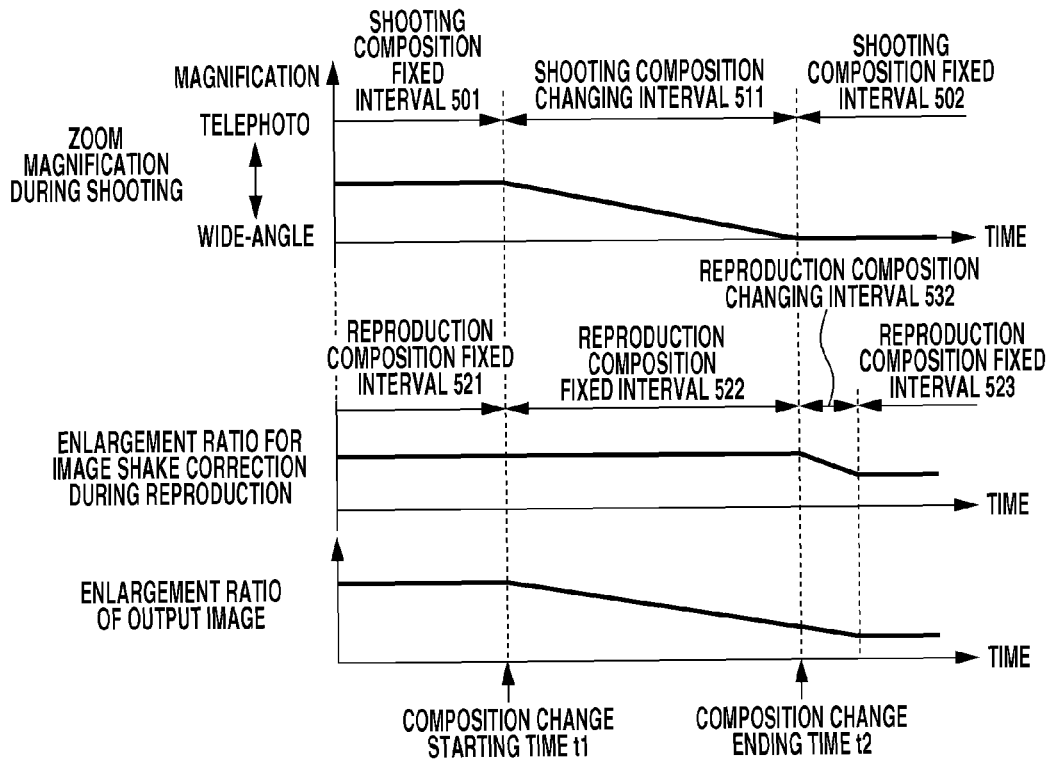

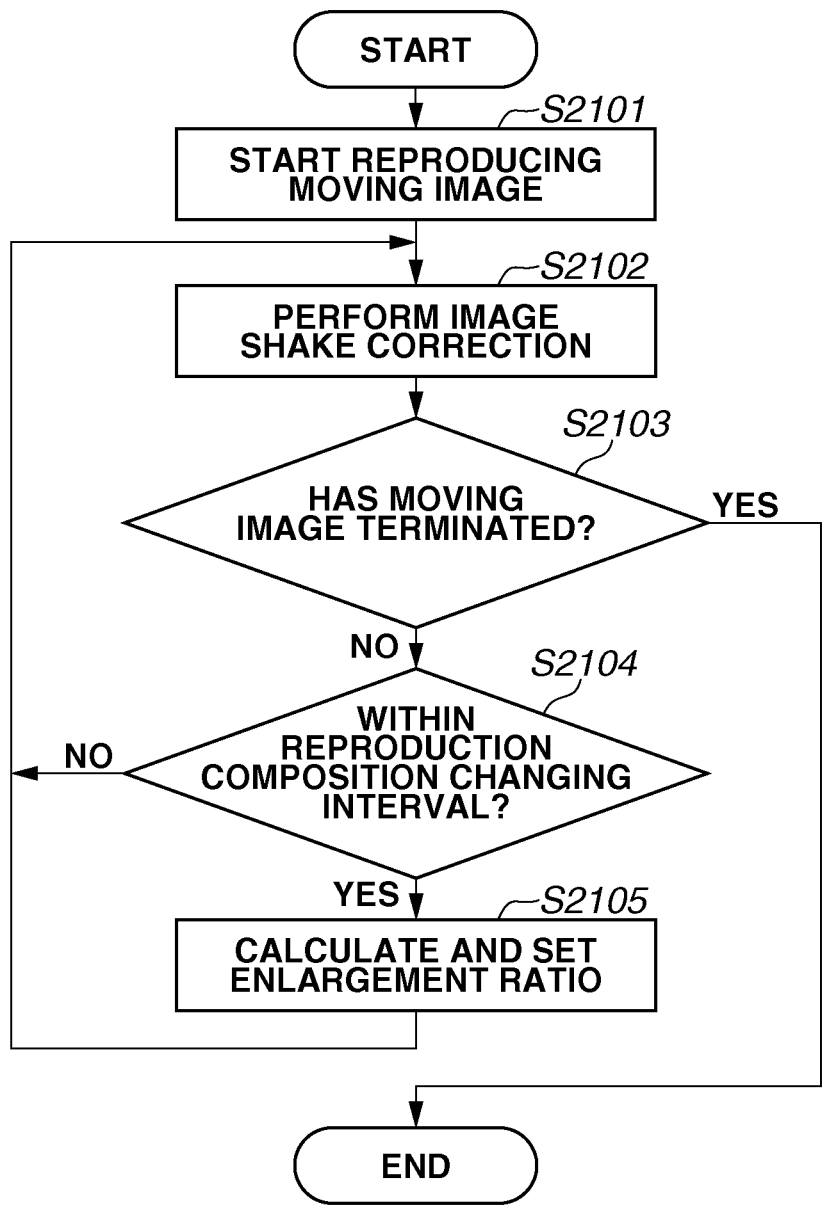

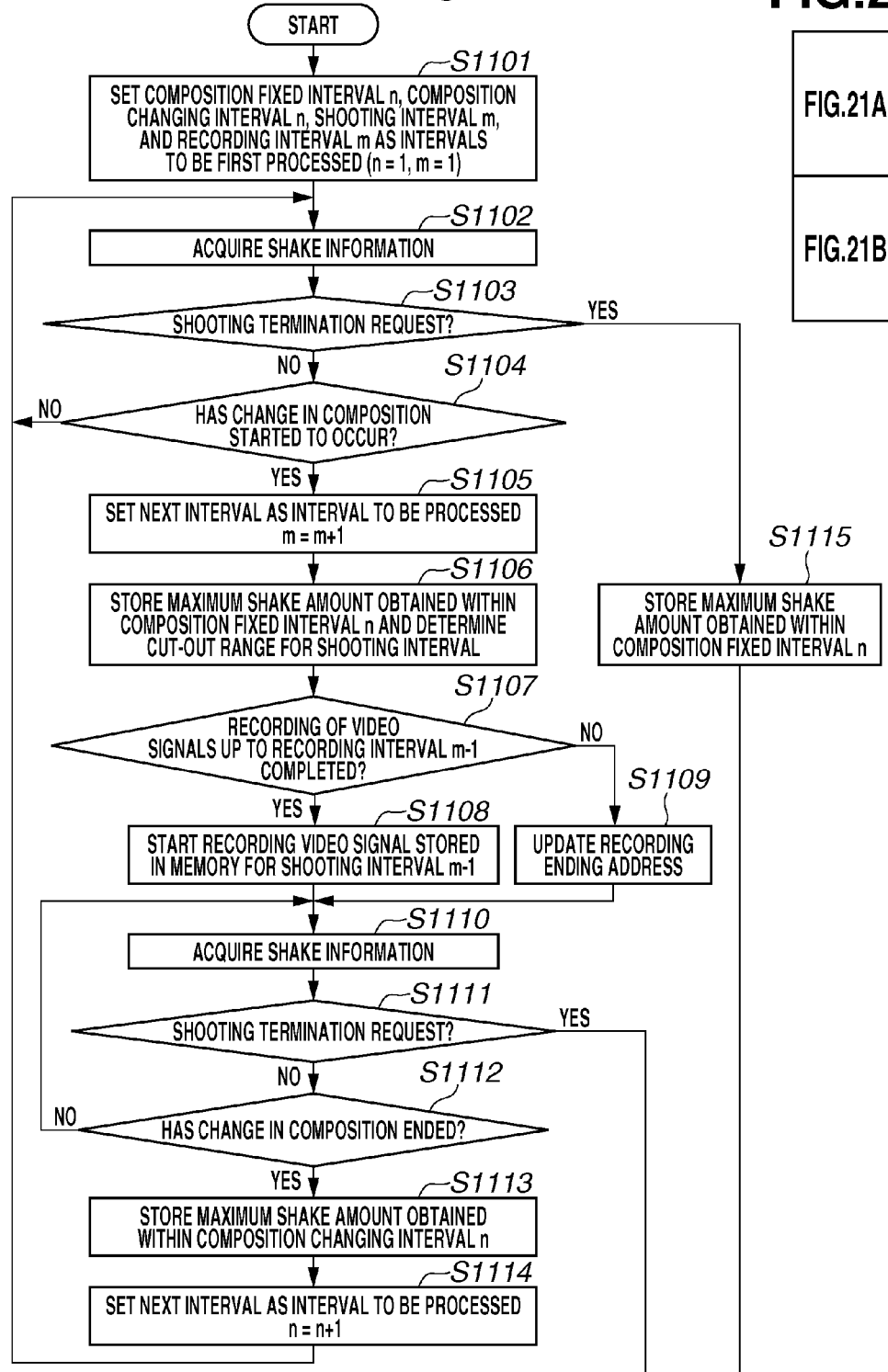

MOVING IMAGE PROCESSING APPARATUS, IMAGING APPARATUS, AND MOVING IMAGE PROCESSING METHOD

BACKGROUND OF THE INVENTION

Field of the Invention

The present invention relates to a moving image processing apparatus, an imaging apparatus, and an image processing method which are capable of correcting, during reproduction of a moving image, blurring or shaking of an image plane due to camera shake or the like.

Description of the Related Art

In recent years, there have been proposed techniques to correct, during reproduction of a moving image, blurring or shaking of an image plane due to camera shake or the like that occurred during shooting of the moving image. As one of image shake correction methods to be performed during reproduction, Japanese Patent Application Laid-Open No. 07-143380 discusses the technique to cut out and extract a predetermined range from a moving image obtained during shooting and to display the extracted range and use the remaining region, outside the predetermined range, as a region for image shake correction.

The technique discussed in Japanese Patent Application Laid-Open No. 07-143380 can minimize deterioration of a moving image by changing the size (enlargement ratio) of a cut-out range extracted from moving image data for the purpose of image shake correction and changing image data within the cut-out range according to the screen size of a monitor. However, the technique discussed in Japanese Patent Application Laid-Open No. 07-143380 is on the premise that users are able to appropriately change the enlargement ratio. More specifically, users may excessively increase the enlargement ratio even during small shakes, thus narrowing the display range of a moving image, or may decrease the enlargement ratio even during large shakes, thus leaving an insufficiently-corrected moving image.

SUMMARY OF THE INVENTION

According to an aspect of the present invention, a moving image processing apparatus includes a shake amount acquisition unit configured to acquire and output a shake amount, a period acquisition unit configured to acquire a period during which a change in composition occurs in a video image, a setting unit configured to set a size and position of a cut-out range of image data for each frame of the video image based on the shake amount output from the shake amount acquisition unit, and a correction unit configured to change, based on the shake amount, the position of the cut-out range set by the setting unit in such a way as to correct shaking of the video image.

According to an exemplary embodiment of the present invention, a moving image processing apparatus and an imaging apparatus can determine, without any user operation, the display range of a moving image without leaving an insufficiently-corrected moving image and change the size (enlargement ratio) of a range to be cut out from image data for image shake correction.

Further features of the present invention will become apparent from the following description of exemplary embodiments with reference to the attached drawings.

BRIEF DESCRIPTION OF THE DRAWINGS

FIG. 1 is a block diagram of a video camera according to a first exemplary embodiment of the present invention.

FIG. 2 is a block diagram of an image shake correction unit according to the first exemplary embodiment.

FIG. 4 is a flowchart of image shake correction information acquisition processing according to the first exemplary embodiment.

FIGS. 7A and 7B are timing charts illustrating timing of a change in composition during shooting, timing of a change in composition of an output image, and what magnification an output field angle obtained for image shake correction during reproduction of a moving image represents relative to a field angle at the wide-angle end during shooting.

FIGS. 8A and 8B are timing charts illustrating timing of a change in composition during shooting, timing of a change in composition of an output image, and what magnification an output field angle obtained for image shake correction during reproduction of a moving image represents relative to a field angle at the wide-angle end during shooting.

FIGS. 9A and 9B are timing charts illustrating timing of a change in composition during shooting, timing of a change in composition of an output image, and what magnification an output field angle obtained for image shake correction during reproduction of a moving image represents relative to a field angle at the wide-angle end during shooting.

FIGS. 10A and 10B are timing charts illustrating timing of a change in composition during shooting, timing of a change in composition of an output image, and what magnification an output field angle obtained for image shake correction during reproduction of a moving image represents relative to a field angle at the wide-angle end during shooting.

FIG. 11 is a flowchart of image shake correction processing during reproduction of a moving image according to the first exemplary embodiment.

DESCRIPTION OF THE EMBODIMENTS

Figure 3A:
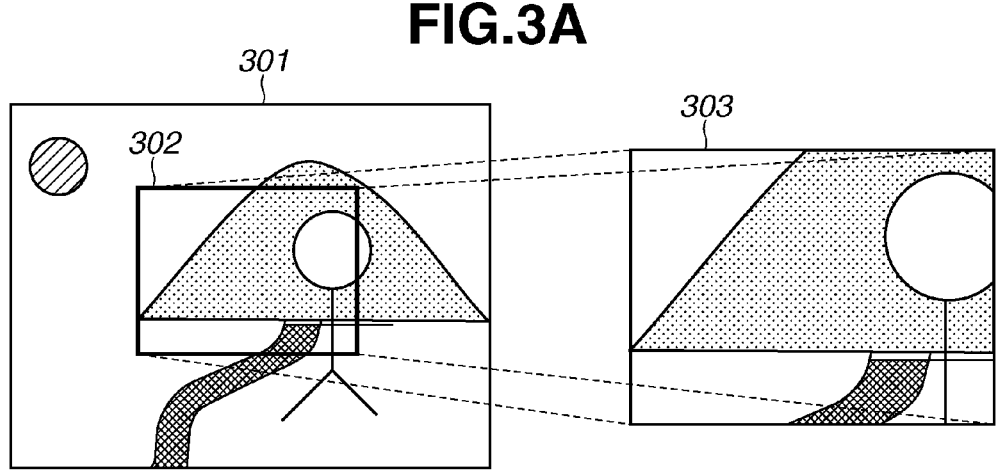
FIGS. 3A and 3B illustrate the conception of image shake correction processing according to the first exemplary embodiment.

Various exemplary embodiments, features, and aspects of the invention will be described in detail below with reference to the drawings.

FIG. 1 illustrates a configuration example a video camera 100, which serves as a moving image processing apparatus capable of recording and reproducing a moving image, according to a first exemplary embodiment of the present invention.

A lens unit 101 includes a stationary lens group, which collects light, a variable magnification lens group, a diaphragm, and a focusing lens group, which has the function to compensate for an image forming position moved due to the movement of the variable magnification lens group and to adjust focus.

The lens unit 101 can optically vary the photographing magnification thereof with the variable magnification lens group being moved in the direction parallel to the optical axis in response to a zoom instruction given by the user via an operation unit 106.

An image sensor 102 converts an optical image formed by the lens unit 101 into an electrical signal for every predetermined time. An analog front end (AFE) 103 reads out an image signal from the image sensor 102 and performs sampling and holding of the image signal, amplification of the image signal, and conversion of the image signal into a digital signal.

A camera signal processing unit 104 performs color separation processing, aperture processing, gamma processing, etc., on the image signal received from the AFE 103, and then generates a luminance signal and color-difference signals. In the present exemplary embodiment, the camera signal processing unit 104 thus outputs YCbCr (4:2:2) image data.

A system control unit 105 is connected to a read-only memory (ROM) 110, a random access memory (RAM) 111, and other blocks via a bus 114, and is configured to control each block.

In the present exemplary embodiment, the system control unit 105 mainly performs the following three processing operations.

(1) The system control unit 105 acquires shake information (information about shaking of the video camera 100) and composition change information (information about a change in composition due to, for example, an optical zoom operation, panning, tilting, or forward or backward movement of an operator who holds the video camera 100). The system control unit 105 uses the acquired data, such as the shake information and composition change information, as image shake correction information for subsequent processing operations.

(2) The system control unit 105 analyzes the image shake correction information and determines the position and size of a cut-out range for image shake correction performed during reproduction of a moving image. More specifically, the system control unit 105 acquires timing of a change in composition occurring during shooting of a moving image, determines intervals according to the composition change timing, and determines the size of a cut-out range for image shake correction performed during reproduction of the moving image based on the intervals.

(3) The system control unit 105 performs image shake correction during reproduction of a moving image by changing a cut-out position using the size of the cut-out range for image shake correction during reproduction of the moving image, determined in the operation (2). The details of the three processing operations are described below. The term "cut-out range" means a range that is output as a display image.

The operation unit 106 transmits the entry of a user operation performed on a zoom lever, a button, or the like. Then, the system control unit 105 performs processing according to the user operation.

A video information output unit 107 displays, on a display unit 115, image data stored in a frame memory 109 or outputs the image data via an external output terminal (not illustrated), such as a High-Definition Multimedia Interface (HDMI) terminal. In the present exemplary embodiment, the display unit 115 is a liquid crystal panel, which can display image data output from the video information output unit 107, but may contain the operation unit 106 as a touch screen.

An image shake correction unit 108 corrects shaking of a moving image stream during reproduction of a moving image by cutting out (extracting) image data from a predetermined cut-out range of image data and changing the cut-out position. During reproduction of a moving image, the system control unit 105 reads out a moving image stream recorded on a recording medium 113 via a recording medium control unit 112 and then loads the moving image stream onto the frame memory 109.

To perform image shake correction during reproduction of a moving image, the image shake correction unit 108 corrects moving image data (moving image stream) loaded on the frame memory 109. In the present exemplary embodiment, a case where image shake correction is performed during reproduction of a moving image is described.

However, the image shake correction unit 108 may perform image shake correction by cutting out moving image data from a predetermined output range of image data during shooting of a moving image and changing the cut-out position.

The frame memory 109 is a memory capable of storing a plurality of frames. The frame memory 109 stores each frame in a desired region under the control of the system control unit 105 to record image data for each frame.

The ROM 110 stores a control program used by the system control unit 105 to control each block illustrated in FIG. 1. The RAM 111 is used as a temporary storage location for data to be used for operations by the system control unit 105.

The recording medium control unit 112 controls recording on and reproduction from the recording medium 113. The recording medium 113 is, for example, NAND type flash memory, on which YCbCr image data stored in the frame memory 109 can be recorded as a moving image stream. Further, shake information during shooting can also been recorded on the recording medium 113 together with the moving image stream.

FIG. 2 is a block diagram illustrating a configuration of the image shake correction unit 108.

An image cut-out unit 201 cuts out (extracts) image data within a predetermined range from image data stored in the frame memory 109 in response to an instruction from an image cut-out control unit 202. The image cut-out control unit 202 determines the position and size of the cut-out range used by the image cut-out unit 201 according to shake information of a moving image acquired by a shake information acquisition unit 206.

In the present exemplary embodiment, the image cut-out control unit 202 determines a cut-out range used for image shake correction during reproduction of a moving image from one frame and determines the enlargement ratio based on the size of the cut-out range and the size of image data.

In the present exemplary embodiment, the enlargement ratio refers to a ratio at which image data from the cut-out range is enlarged according to a desired screen size (for example, the screen size of the display unit 115).

However, the image shake correction may be controlled based on a cut-out range calculated by the use of the enlargement ratio, or may be controlled directly based on the size of the cut-out range or the coordinates on the image data.

An enlargement processing unit 203 performs resolution conversion at predetermined timing in response to an instruction from an enlargement ratio control unit 204. The enlargement ratio control unit 204 issues an instruction to the enlargement processing unit 303 about the setting of an enlargement or reduction ratio or the timing for enlargement or reduction according to shake information output from the shake information acquisition unit 206 and composition change information output from a composition change information acquisition unit 208.

A shake detection unit 205, serving as a shake amount acquisition unit, functions as a unit to detect shake information indicating shaking of the video camera 100 during shooting or reproduction of a moving image. Various shake detection methods can be considered. For example, the shake detection unit 205 may be configured as an angular velocity sensor or an acceleration sensor, serving as a shake detection sensor, to detect the amount of displacement (for example, angular velocity) in each of the vertical and horizontal directions of the video camera 100.

In a case where the shake detection unit 205 is configured as an angular velocity sensor or an acceleration sensor, shaking detected by the sensor is output as a shake signal. The shake signal is then subjected to filter processing, such as low-pass filter (LPF) processing, and is calculated as the shake amount of an optical image formed on the surface of the image sensor 102.

In this instance, even when the amount of movement (shaking) is the same, the shake amount of an optical image formed on the surface of the image sensor 102 varies with zoom magnifications.

Therefore, in a case where the shake detection unit 205 is configured as an angular velocity sensor or an acceleration sensor, the image shake correction unit 108 calculates the shake amount on an image plane of the optical image based on a sensor output (shake signal) in consideration of the optical zoom magnification. Then, the image shake correction unit 108 outputs, from the shake detection unit 205, a result of the calculation as the amount of movement of a cut-out range of image data.

The shake detection unit 205 may detect, as a motion vector, the amount of shift between frames in a moving image due to shaking in the horizontal or vertical direction. In this case, the magnitude of the motion vector corresponds to the shake amount.

In addition, in the case of a lens-interchangeable camera, such as a digital single-lens reflex camera, the shake detection unit 205 may be mounted in a lens apparatus and the image shake correction unit 108 may be mounted in a camera body, so that shake information or composition change information is communicated between the lens apparatus and the camera body.

In this case, the shake detection unit 205 may be arranged in the camera body and may acquire the shake information from the lens apparatus via communication.

The system control unit 105 records, on the recording medium 113, the direction of shaking and the amount of shaking (the amount of shaking of a video signal or the magnitude of a motion vector) on the image sensor 102 detected by the shake detection unit 205 for each of components in the horizontal and vertical directions. On this occasion, the system control unit 105 records, on the recording medium 113, the shake information and a moving image stream in temporal association with each other in such a manner that the timing of detection of shaking matches the timing of shooting of a video image.

While shake information is recorded on the recording medium 113, shake information obtained during the entire shooting may be recorded on the RAM 111. In the present exemplary embodiment, the maximum shake amount within a predetermined period (a composition fixed interval, described below) is recorded on the RAM 111.

The shake information acquisition unit 206 retrieves, from the recording medium 113, shake information associated with a moving image to be reproduced.

A composition change detection unit 207 detects a change in composition during shooting, for example, a change in composition due to, for example, an optical zoom operation, panning, tilting, or forward or backward movement of an operator who holds the video camera 100. Now, a description is given about how the composition change detection unit 207 detects an optical zoom operation being performed. When the user has performed an optical zoom operation via the operation unit 106, the system control unit 105 notifies the composition change detection unit 207 that the composition has changed.

A change in composition may be detected by the shake detection unit 205 detecting a change in image plane based on a sensor output or a motion vector. More specifically, the composition change detection unit 207 acquires timing of a change in composition within a moving image stream, divides the moving image stream into intervals, and determines a cut-out range for image shake correction during reproduction of a moving image for each interval.

The system control unit 105 records, on the recording medium 113, composition change information detected in the above-described manner and a moving image stream in temporal association with each other in such a manner that the timing of detection of a change in composition matches the timing of shooting of a video image.

The composition change information acquisition unit 208 acquires composition change information within a moving image stream. In the present exemplary embodiment, the composition change information acquisition unit 208 retrieves, from the recording medium 113, composition change information associated with a moving image stream to be reproduced.

Figure 3B:
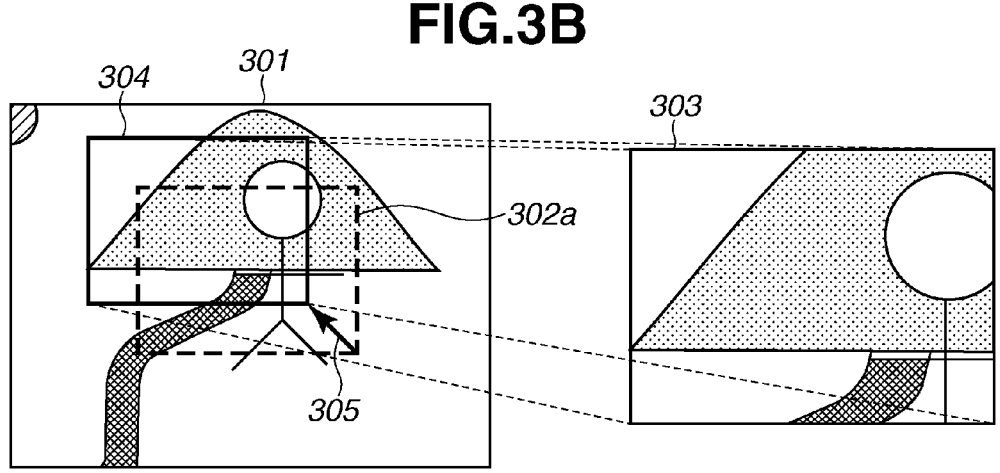

FIGS. 3A and 3B illustrate correction operations performed by the image shake detection unit 108.

A cut-out operation is described with reference to FIG. 3A. The image cut-out control unit 202 sets a cut-out frame 302 on image data 301 (moving image stream) loaded on the frame memory 109. Then, the image cut-out unit 201 reads image data within the cut-out frame 302. The enlargement processing unit 203 performs enlargement processing and resolution conversion at the enlargement ratio (the size of the cut-out range relative to the size of an image) indicated by an instruction from the enlargement ratio control unit 204.

Then, the image shake detection unit 108 converts image data within the cut-out frame 302 into an output image 303, which is an image of the image size to be output by the video information output unit 107, and stores the output image 303 into the frame memory 109. The output image 303 stored in the frame memory 109 can be displayed on the display unit 115 by the video information output unit 107 or can be output to an external output terminal (not illustrated), such as an HDMI terminal.

Next, a correction operation of the image shake correction unit 108 is described with reference to FIG. 3B. Suppose that regions 302a and 304 illustrated in FIG. 3B are partial areas of image data of the current frame and that the region 302 is a partial area of image data of the previous frame (a frame one frame before the current frame). At this time, suppose that the region 302 illustrated in FIG. 3A and the region 302a illustrated in FIG. 3B are the same on the surface of the image sensor 102.

However, due to camera shake or the like applied by the operator between the previous frame and the current frame, image data read from the region 302 of image data of the previous frame and image data read from the region 302a of image data of the current frame are different from each other. The image shake correction unit 108 detects such a region 304 as to maximize a similarity between image data read from the region 302 of the previous frame and image data read from the region 302a of the current frame.

The image shake correction unit 108 can detect the region 304 by detecting feature points or using a block matching method. Then, the image shake correction unit 108 can detect a shake amount or a motion vector 305 on the actual image plane based on the region 302 of the previous frame and the region 304 of the current frame. The image shake correction unit 108 thus acquires the output image 303 converted based on the region 304 set based on the shake amount or the motion vector 305.

<Acquisition of Image Shake Correction Information>

Next, the acquisition of image shake correction information by the system control unit 105 is described in detail with reference to the flowchart of FIG. 4 and the schematic diagram of FIG. 5. The image shake correction information indicates starting and ending times of a composition fixed interval and starting and ending times of a composition changing interval, which are described below with reference to FIG. 5, maximum shake amounts obtained within the respective intervals, and shake amounts of shakes in the horizontal and vertical directions in frames at the respective times.

To perform image shake correction during reproduction according to the present exemplary embodiment, the system control unit 105 divides a moving image stream into a plurality of intervals starting points of which are at the time of start of shooting and at the time of a change in composition. First, a brief description is given with reference to FIG. 5 about how the system control unit 105 generates specific intervals.

Figure 5:
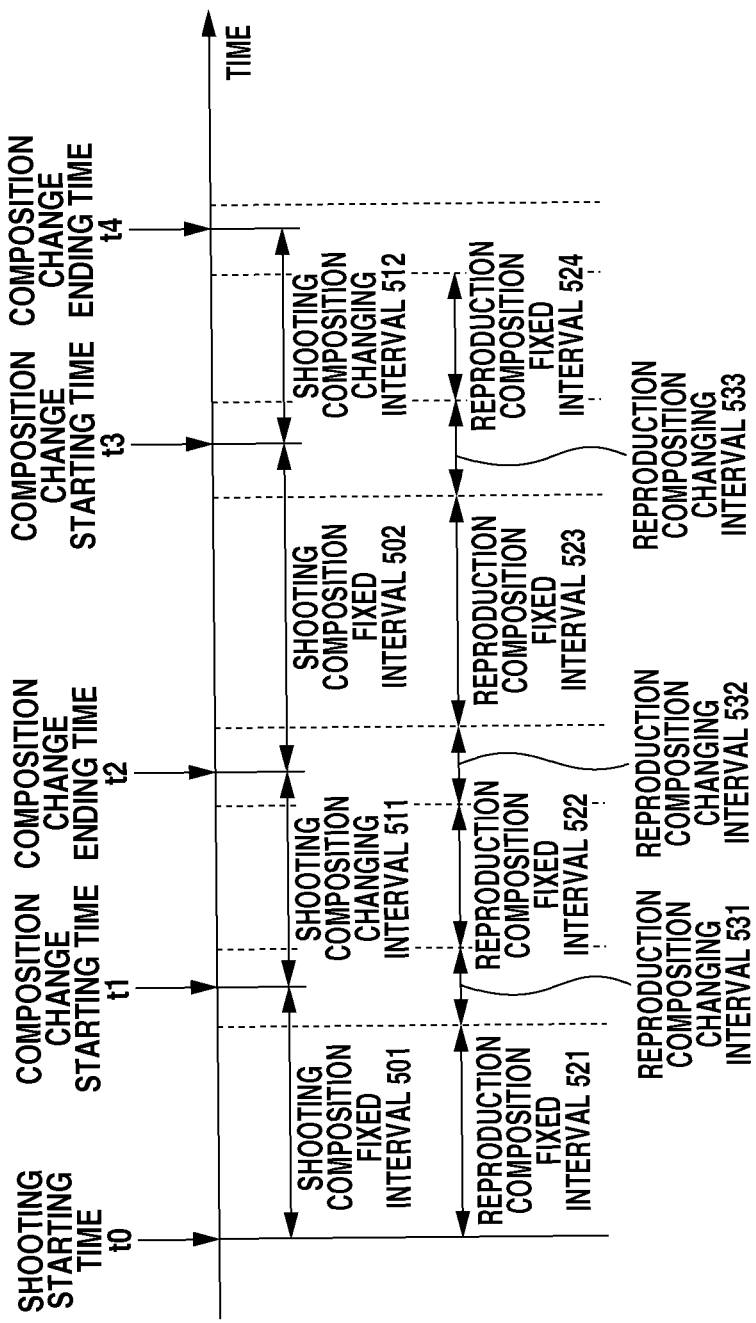
FIG. 5 is a schematic diagram illustrating a shooting composition fixed interval, a shooting composition changing interval, a reproduction composition fixed interval, and a reproduction composition changing interval.

The horizontal direction in FIG. 5 indicates a time axis. As the position in the horizontal direction moves to the right, time progresses. Referring to FIG. 5, an interval from shooting starting time t0, at which shooting of a moving image starts, to composition change starting time t1, at which a change in composition due to a zoom operation or panning during shooting starts, is referred to as a shooting composition fixed interval 501. An interval from the composition change starting time t1 to composition change ending time t2, at which a change in composition due to a zoom operation or panning during shooting ends, is referred to as a shooting composition changing interval 511.

Subsequently, a period in which a change in composition due to a zoom operation or panning during shooting occurs and a period in which no change in composition due to a zoom operation or panning during shooting occurs appear alternately. In this case, an interval from the composition change ending time t2 to composition change starting time t3 is referred to as a shooting composition fixed interval 502. An interval from the composition change fixed time t3 to composition change ending time t4 is referred to as a shooting composition changing interval 512. In this way, the system control unit 105 alternately adds a shooting composition fixed interval and a shooting composition changing interval until shooting is terminated.

Next, a method for acquiring the image shake correction information is described with reference to the flowchart of FIG. 4.

In step S401, the system control unit 105 starts shooting of a moving image in response to a shooting start instruction from the user operating the operation unit 106. When starting shooting, the system control unit 105 generates a shooting composition fixed interval 1 (n=1). Then, the system control unit 105 sets the shooting composition fixed interval 1 as an interval to be processed.

In step S402, the shake detection unit 205 included in the image shake detection unit 108 acquires shake information with respect to all frames in the process of shooting.

Then, the system control unit 105 records, on the recording medium 113 via the recording medium control unit 112, the direction of shaking and the shake amount (the magnitude of a motion vector) together with time at which shaking has occurred. In the present exemplary embodiment, the system control unit 105 records the maximum shake amount within the same composition fixed interval on the RAM 111.

In step S403, the system control unit 105 determines whether a shooting termination request has been issued by the user operating the operation unit 106. If the system control unit 105 determines that the shooting termination request has been issued (YES in step S403), the processing proceeds to step S411 to perform end processing. In step S411, the system control unit 105 sets an interval lasting until the shooting termination request has been issued as a composition fixed interval n, and records, on the RAM 111, the maximum shake amount within the composition fixed interval n. If the system control unit 105 determines that no shooting termination request has been issued (NO in step S403), the processing proceeds to step S404.

In step S404, the system control unit 105 determines whether a change in composition has started to occur due to a zoom operation, panning, or the like, via the composition change detection unit 207 included in the image shake correction unit 108. If the system control unit 105 determines that no change in composition has started to occur (NO in step S404), the processing returns to step S402, in which the system control unit 105 acquires shake information.

If the system control unit 105 determines that a change in composition has started to occur (YES in step S404), the processing proceeds to step S405. In step S405, the system control unit 105 records, on the RAM 111, the maximum shake amount within the composition fixed interval n. More specifically, when a composition fixed interval has ended and a composition changing interval has started, the system control unit 105 records, on the RAM 111, the maximum shake amount within the composition fixed interval n. In step S406, the system control unit 105 acquires shake information within the composition changing interval as in step S402.

In step S407, the system control unit 105 determines whether a shooting termination request has been issued by the user operating the operation unit 106. If the system control unit 105 determines that the shooting termination request has been issued (YES in step S407), the processing proceeds to step S412. In step S412, the system control unit 105 sets an interval lasting until the shooting termination request has been issued as a composition changing interval n, and records, on the RAM 111, the maximum shake amount within the composition changing interval n. Then, the processing ends.

In step S408, the system control unit 105 determines whether a change in composition has ended due to the completion of the zoom operation, the completion of panning, or the like, via the composition change detection unit 207. If the system control unit 105 determines that the change in composition is continuing (NO in step S408), the processing returns to step S406, in which the system control unit 105 acquires shake information. If the system control unit 105 determines that the change in composition has ended (YES in step S408), the processing proceeds to step S409.

In step S409, the system control unit 105 records, on the RAM 111, the maximum shake amount within the composition changing interval n. In step S410, the system control unit 105 adds "1" to the composition fixed interval n to obtain a composition fixed interval n+1 so as to set the next interval as an interval to be processed. Then, the processing returns to step S402, in which the system control unit 105 acquires shake information within the composition fixed interval n+1.

<Analysis of Image Shake Correction Information and Determination of Cut-Out Range>

Next, the analysis of image shake correction information and the determination of a cut-out range for image shake correction during reproduction of a moving image, which are performed by the system control unit 105, are described with reference to the flowchart of FIG. 6 and the timing charts of FIGS. 7A and 7B.

In the present exemplary embodiment, in performing image shake correction during reproduction, the system control unit 105 sets both a reproduction composition fixed interval and a reproduction composition changing interval. The reproduction composition fixed interval refers to an interval for which the cut-out range for image shake correction during reproduction is fixed, i.e., an interval for which the enlargement ratio for image shake correction during reproduction is fixed. The reproduction composition changing interval refers to an interval for which the cut-out range for image shake correction during reproduction is changing, i.e., an interval for which the enlargement ratio for image shake correction during reproduction is changing.

In the present exemplary embodiment, the system control unit 105 determines the enlargement ratios for image shake correction during reproduction in each shooting composition fixed interval and each shooting composition changing interval. Then, the system control unit 105 sets reproduction composition fixed intervals corresponding to each shooting composition fixed interval and each shooting composition changing interval.

However, since the maximum image shake correction amounts in each shooting composition fixed interval and each shooting composition changing interval differ, the enlargement ratios in the respective reproduction composition fixed intervals also differ. If the enlargement ratio is suddenly changed across a reproduction composition fixed interval, the enlargement ratio of an output image changes suddenly, thus giving an uncomfortable feeling to the user.

Here, suppose that a period in which a change in composition due to a zoom operation or panning during shooting occurs and a period in which no change in composition due to a zoom operation or panning during shooting occurs appear alternately. In this case, the system control unit 105 provides a reproduction composition changing interval between reproduction composition fixed intervals. The system control unit 105 gradually changes the enlargement ratio for image shake correction during reproduction in the reproduction composition changing interval, thus reducing any uncomfortable feeling given to the user.

While, in FIG. 5, a reproduction composition changing interval is provided between reproduction composition fixed intervals, a method for determining the length of each interval is described below. More specifically, while, in FIG. 5, a reproduction composition changing interval 531 contains composition change starting time t1 in the middle thereof, the starting time or ending time of the reproduction composition changing interval 531 may correspond to the composition change starting time t1.

Furthermore, when the maximum image shake correction amounts within the respective shooting composition changing intervals are the same, since the enlargement ratios for image shake correction during reproduction are also the same, it is not necessary to provide a reproduction composition changing interval.

In image shake correction during reproduction according to the present exemplary embodiment, the system control unit 105 changes the size of the cut-out range for every interval of a moving image stream. In the present exemplary embodiment, a case is described where the system control unit 105 analyzes image shake correction information based on the maximum shake amounts recorded on the RAM 111, after the completion of shooting of a moving image. However, the system control unit 105 may analyze image shake correction information during shooting of a moving image.

Figure 6:
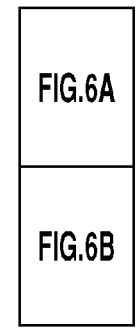
FIG. 6, which is composed of FIGS. 6A and 6B, is a flowchart of image shake correction information analytical processing according to the first exemplary embodiment.
Figure 6A:
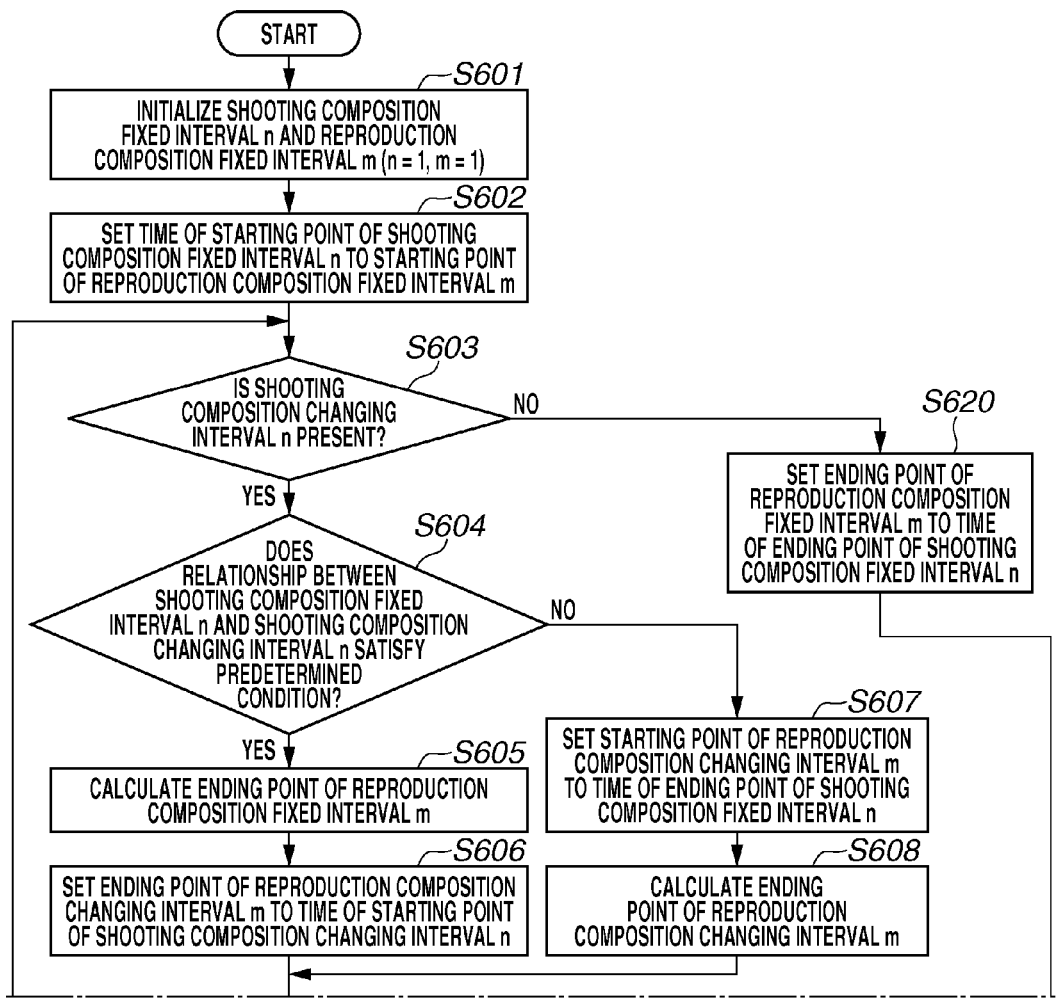
Figure 6B:
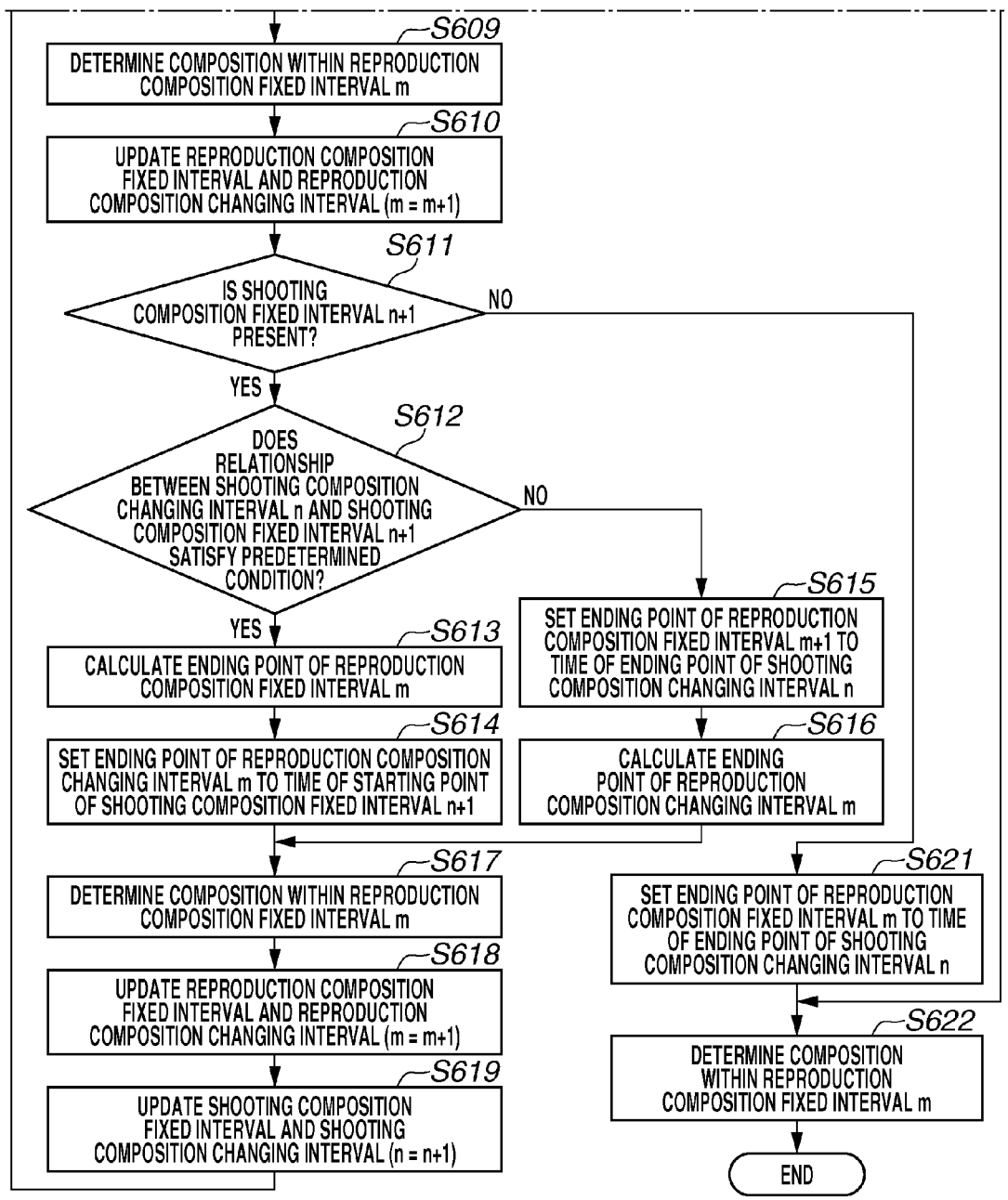

Referring to FIG. 6, which is composed of FIGS. 6A and 6B, in step S601, the system control unit 105 initializes a shooting composition fixed interval n and a reproduction composition fixed interval m to set n=1 and m=1. In step S602, the system control unit 105 determines a starting point of the shooting composition fixed interval n. More specifically, the system control unit 105 sets time of the starting point of the shooting composition fixed interval n (time t0 in FIG. 5) to time of a starting point of the reproduction composition fixed interval m.

In step S603, the system control unit 105 determines whether a change in composition occurs in the currently reproduced moving image stream. In image shake correction during reproduction of a moving image according to the present exemplary embodiment, the system control unit 105 determines whether a change in composition occurs in a portion of the moving image stream to be next reproduced relative to the currently reproduced portion of the moving image stream, i.e., whether a shooting composition changing interval is present next to the currently reproduced portion.

For example, in FIG. 5, the system control unit 105 determines whether a shooting composition changing interval 511 is present next to the shooting composition fixed interval 501. Then, the system control unit 105 determines a cut-out range for image shake correction during reproduction of a moving image based on whether a shooting composition changing interval is present next to the currently reproduced portion.

If the system control unit 105 determines that a shooting composition changing interval (a shooting composition changing interval n) is present next to the currently reproduced portion (YES in step S603), the processing proceeds to step S604. If the system control unit 105 determines that no shooting composition changing interval is present next to the currently reproduced portion (NO in step S603), the processing proceeds to step S620. In step S620, since there is no shooting composition changing interval n, the system control unit 105 sets time of an ending point of the reproduction composition fixed interval m to time of an ending point of the shooting composition fixed interval n. Then, the processing proceeds to step S622.

In step S604, the system control unit 105 determines whether the relationship between a shooting composition fixed interval and a subsequent shooting composition changing interval satisfies a predetermined condition. The predetermined condition includes, for example, the following conditions:
(i) whether a change in shooting composition in the shooting composition changing interval indicates the enlargement direction or the reduction direction, i.e., whether zooming in the shooting composition changing interval advances from the wide-angle side to the telephoto side or advances from the telephoto side to the wide-angle side; and
(ii) which of the maximum shake amount within the shooting composition fixed interval and the maximum shake amount within the subsequent shooting composition changing interval is larger.

In step S604, the predetermined condition being satisfied means the following events:
(A) A change in shooting composition in the shooting composition changing interval (the shooting composition changing interval 511) indicates the enlargement direction, i.e., zooming in the shooting composition changing interval advances from the wide-angle side to the telephoto side, and the maximum shake amount within the subsequent shooting composition changing interval (the shooting composition changing interval 511) is larger than the maximum shake amount within the shooting composition fixed interval (the shooting composition fixed interval 501); or
(B) A change in shooting composition in the shooting composition changing interval (the shooting composition changing interval 511) indicates the reduction direction, i.e., zooming in the shooting composition changing interval advances from the telephoto side to the wide-angle side, and the maximum shake amount within the subsequent shooting composition changing interval (the shooting composition changing interval 511) is smaller than the maximum shake amount within the shooting composition fixed interval (the shooting composition fixed interval 501).

The details of the determination in step S604 and processing in steps S605 to S608 are described with reference to FIGS. 7A and 7B and FIGS. 8A and 8B.

FIGS. 7A and 7B and FIGS. 8A and 8B each illustrate timing of a change in composition during shooting, timing of a change in composition of an output image, and magnifications of the output field angle for image shake correction during reproduction of a moving image relative to the field angle at the wide-angle end during shooting. In the following description, numerals in parentheses, such as "(511)", denote the corresponding intervals in the examples illustrated in FIGS. 7A and 7B to FIGS. 10A and 10B.

In the examples illustrated in FIGS. 7A and 7B and FIGS. 8A and 8B, suppose that the moving image stream shifts, as a result of a change in composition, from the shooting composition fixed interval n (the shooting composition fixed interval 501 in FIG. 5) to the shooting composition changing interval n (511) and then shifts to the shooting composition fixed interval n+1 (502).

In the example illustrated in FIG. 7A, zooming advances from the wide-angle side to the telephoto side in the shooting composition changing interval 511. In addition, there occurs a condition of "the maximum shake amount within the shooting composition changing interval 511" being larger than "the maximum shake amount within the shooting composition fixed interval 501". Thus, this example satisfies the above-described condition (A). On the other hand, in the example illustrated in FIG. 7B, zooming advances from the telephoto side to the wide-angle side in the shooting composition changing interval 511. In addition, there occurs a condition of "the maximum shake amount within the shooting composition changing interval 511" being smaller than "the maximum shake amount within the shooting composition fixed interval 501". Thus, this example satisfies the above-described condition (B).

In the example illustrated in FIG. 8A, zooming advances from the wide-angle side to the telephoto side in the shooting composition changing interval 511. In addition, there occurs a condition of "the maximum shake amount within the shooting composition changing interval 511" being smaller than "the maximum shake amount within the shooting composition fixed interval 501". Thus, this example satisfies neither the condition (A) nor the condition (B).

On the other hand, in the example illustrated in FIG. 8B, zooming advances from the telephoto side to the wide-angle side in the shooting composition changing interval 511. In addition, there occurs a condition of "the maximum shake amount within the shooting composition fixed interval 501" being smaller than "the maximum shake amount within the shooting composition changing interval 511". Thus, this example satisfies neither the condition (A) nor the condition (B).

If the condition (A) or the condition (B) is satisfied (YES in step S604), the processing proceeds to step S605.

Processing in steps S606 and S606 is described with reference to FIGS. 7A and 7B, which illustrate the example satisfying the condition (B). First, the system control unit 105 calculates a rate of change of composition per unit time in the shooting composition changing interval n (511). Next, the system control unit 105 acquires maximum shake amounts in the shooting composition fixed interval n (501) and the shooting composition changing interval n (511). Then, the system control unit 105 obtains the enlargement ratio required for image shake correction in each of a reproduction composition fixed interval m (521), which corresponds to the shooting composition fixed interval n (501), and a reproduction composition fixed interval m+1 (522), which corresponds to the shooting composition changing interval n (511).

Then, the system control unit 105 calculates a time required for changing the enlargement ratio from the reproduction composition fixed interval m (521) to the reproduction composition fixed interval m+1 (522). The system control unit 105 sets, based on the calculated time, the ending point of the reproduction composition fixed interval m (521) and the starting point of a reproduction composition changing interval m (531). On this occasion, the system control unit 105 stores, into the RAM 111, the calculated time and a rate of change of the enlargement ratio required for image shake correction during reproduction.

In this way, the system control unit 105 performs control such that the rate of change of the enlargement ratio of an output image in a reproduction composition changing interval becomes equal to the rate of change of the enlargement ratio of an output image due to a change in zoom magnification in a shooting composition changing interval. For example, in the examples illustrated in FIGS. 7A and 7B, the rates of change of the enlargement ratio of an output image in the reproduction composition changing interval 531 and the shooting composition changing interval 511 become equal to each other.

In step S605, the system control unit 105 calculates the ending point of the reproduction composition fixed interval m and the starting point of the reproduction composition changing interval m. In step S606, the system control unit 105 sets the ending point of the reproduction composition changing interval 531 to the composition change starting time t1, which is time of the starting point of the shooting composition changing interval n (511).

On the other hand, if neither the condition (A) nor the condition (B) is satisfied (NO in step S604), the processing proceeds to step S607.

Processing in steps S607 and S608 is described with reference to FIGS. 8A and 8B. Here, in step S604, the predetermined condition not being satisfied means the following events:
(C) A change in shooting composition in the shooting composition changing interval (the shooting composition changing interval 511) indicates the enlargement direction, i.e., zooming in the shooting composition changing interval advances from the wide-angle side to the telephoto side, and the maximum shake amount within the shooting composition fixed interval n (the shooting composition fixed interval 501) is larger than the maximum shake amount within the subsequent shooting composition changing interval n (the shooting composition changing interval 511); or
(D) A change in shooting composition in the shooting composition changing interval (the shooting composition changing interval 511) indicates the reduction direction, i.e., zooming in the shooting composition changing interval advances from the telephoto side to the wide-angle side, and the maximum shake amount within the subsequent shooting composition changing interval (the shooting composition changing interval 511) is larger than the maximum shake amount within the shooting composition fixed interval (the shooting composition fixed interval 501).

In step S607, the system control unit 105 sets the starting point of the reproduction composition changing interval 531 to the composition change starting time t1, which is time of the starting point of the shooting composition changing interval n (511). In step S608, the system control unit 105 calculates the ending point of the reproduction composition changing interval m and the starting point of the reproduction composition fixed interval m+1.

More specifically, the system control unit 105 calculates a rate of change of composition per unit time in the shooting composition changing interval n (511). Then, the system control unit 105 acquires maximum shake amounts in the shooting composition fixed interval n (501) and the shooting composition changing interval n (511). Then, the system control unit 105 obtains the enlargement ratio required for image shake correction in each of the reproduction composition fixed interval m (521), which corresponds to the shooting composition fixed interval n (501), and the reproduction composition fixed interval m+1 (522), which corresponds to the shooting composition changing interval n (511).

Then, the system control unit 105 calculates a time required for changing the enlargement ratio from the reproduction composition fixed interval m (521) to the reproduction composition fixed interval m+1 (522). The system control unit 105 sets, based on the calculated time, the ending point of the reproduction composition changing interval m (531) and the starting point of the reproduction composition fixed interval m+1 (522). On this occasion, the system control unit 105 stores, into the RAM 111, the calculated time and a rate of change of the enlargement ratio required for image shake correction during reproduction.

In this way, the system control unit 105 performs control such that the rate of change of the enlargement ratio in a reproduction composition changing interval and the rate of change of the zoom magnification in a shooting composition changing interval cancel each other, so that the rate of change of the enlargement ratio of an output image in the reproduction composition changing interval become zero. For example, in the examples illustrated in FIGS. 8A and 8B, the rate of change of the enlargement ratio of an output image in the reproduction composition changing interval 531 becomes zero even though the zoom magnification is changing in the shooting composition changing interval 511.

In step S609, the system control unit 105 calculates and determines an output image range (composition) in the reproduction composition fixed interval m (521). To perform image shake correction during reproduction of a moving image, it is necessary to extract (cut out) an image within a predetermined range.

The system control unit 105 enlarges (performs electronic zooming on) an image within the predetermined range to display the enlarged image as an output image on the display unit 115 or to record the enlarged image as a recording image on the recording medium 113. The "predetermined range" is determined according to the maximum shake amount within the shooting composition fixed interval n. For example, when the shake amount is large, since it is necessary to move the image widely, the "predetermined range" becomes narrower compared with an imaging range. In addition, the system control unit 105 stores the calculated composition information into the RAM 111.

In step S610, the system control unit 105 sets a next reproduction composition fixed interval and a next reproduction composition changing interval as intervals to be processed.

In step S611, the system control unit 105 determines whether a next shooting composition fixed interval (shooting composition fixed interval n+1) is present. The absence of a next shooting composition fixed interval (shooting composition fixed interval n+1) indicates that the moving image stream terminates at the end of the subsequent shooting composition changing interval (shooting composition changing interval n). If the system control unit 105 determines that a next shooting composition fixed interval (shooting composition fixed interval n+1) is present (YES in step S611), the processing proceeds to step S612. If the system control unit 105 determines that no next shooting composition fixed interval is present (NO in step S611), the processing proceeds to step S621.

In step S621, since there is no next shooting composition fixed interval (n+1), the system control unit 105 sets the ending point of the reproduction composition fixed interval m to time of the ending point of the shooting composition changing interval n.

Then, in step S622, the system control unit 105 calculates and determines an output image range (composition) in the reproduction composition fixed interval m. To perform image shake correction during reproduction of a moving image, it is necessary to extract (cut out) an image within a predetermined range. The system control unit 105 enlarges (performs electronic zooming on) an image within the predetermined range to display the enlarged image as an output image on the display unit 115 or to record the enlarged image as a recording image on the recording medium 113.

In step S612, the system control unit 105 determines whether the relationship between a shooting composition changing interval and a subsequent shooting composition fixed interval satisfies a predetermined condition, as in step S604. The predetermined condition includes, for example, the following conditions:

(iii) whether a change in shooting composition in the shooting composition fixed interval indicates the enlargement direction or the reduction direction, i.e., whether zooming in the shooting composition changing interval advances from the wide-angle side to the telephoto side or advances from the telephoto side to the wide-angle side; and (iv) which of the maximum shake amount within the shooting composition changing interval and the maximum shake amount within the subsequent shooting composition fixed interval is larger.

In step S612, the predetermined condition being satisfied means the following events:

(E) A change in shooting composition in the shooting composition changing interval (the shooting composition changing interval 511) indicates the enlargement direction, i.e., zooming in the shooting composition changing interval advances from the wide-angle side to the telephoto side, and the maximum shake amount within the shooting composition changing interval (the shooting composition changing interval 511) is larger than the maximum shake amount within the subsequent shooting composition fixed interval (the shooting composition fixed interval 502); or (F) A change in shooting composition in the shooting composition changing interval (the shooting composition changing interval 511) indicates the reduction direction, i.e., zooming in the shooting composition changing interval advances from the telephoto side to the wide-angle side, and the maximum shake amount within the subsequent shooting composition fixed interval (the shooting composition fixed interval 502) is larger than the maximum shake amount within the shooting composition changing interval (the shooting composition changing interval 511).

The details of the determination in step S612 and processing in steps S613 to S616 are described with reference to FIGS. 9A and 9B and FIGS. 10A and 10B. FIGS. 9A and 9B and FIGS. 10A and 10B each illustrate timing of a change in composition during shooting, timing of a change in composition of an output image, and magnifications of the output field angle for image shake correction during reproduction of a moving image relative to the field angle at the wide-angle end during shooting.

In the examples illustrated in FIGS. 9A and 9B and FIGS. 10A and 10B, suppose that the moving image stream shifts, as a result of a change in composition, from the shooting composition fixed interval n (the shooting composition fixed interval 501 in FIG. 5) to the shooting composition changing interval n (511) and then shifts to the shooting composition fixed interval n+1 (502).

In the example illustrated in FIG. 9A, zooming advances from the wide-angle side to the telephoto side in the shooting composition changing interval 511. In addition, there occurs a condition of "the maximum shake amount within the shooting composition changing interval 511" being larger than "the maximum shake amount within the shooting composition fixed interval 502". Thus, this example satisfies the above-described condition (E). On the other hand, in the example illustrated in FIG. 9B, zooming advances from the telephoto side to the wide-angle side in the shooting composition changing interval 511. In addition, there occurs a condition of "the maximum shake amount within the shooting composition fixed interval 502" being larger than "the maximum shake amount within the shooting composition changing interval 511". Thus, this example satisfies the above-described condition (F).

In the example illustrated in FIG. 10A, zooming advances from the wide-angle side to the telephoto side in the shooting composition changing interval 511. In addition, there occurs a condition of "the maximum shake amount within the shooting composition changing interval 511" being smaller than "the maximum shake amount within the shooting composition fixed interval 502". Thus, this example satisfies neither the condition (E) nor the condition (F).

On the other hand, in the example illustrated in FIG. 10B, zooming advances from the telephoto side to the wide-angle side in the shooting composition changing interval 511. In addition, there occurs a condition of "the maximum shake amount within the shooting composition fixed interval 502" being smaller than "the maximum shake amount within the shooting composition changing interval 511". Thus, this example satisfies neither the condition (E) nor the condition (F).

If the condition (E) or the condition (F) is satisfied (YES in step S612), the processing proceeds to step S613. In step S613, the system control unit 105 calculates the ending point of the reproduction composition fixed interval m (522), i.e., the starting point of the reproduction composition changing interval m (532).

Processing in steps S613 and S614 is described with reference to FIGS. 9A and 9B. First, the system control unit 105 calculates a rate of change of composition per unit time in the shooting composition changing interval n (511). Next, the system control unit 105 acquires maximum shake amounts in the shooting composition changing interval n (511) and the shooting composition fixed interval n+1 (502). Then, the system control unit 105 obtains the enlargement ratio required for image shake correction in each of a reproduction composition fixed interval m+1 (522), which corresponds to the shooting composition changing interval n (511), and a reproduction composition fixed interval m+2 (523), which corresponds to the shooting composition fixed interval n+1 (502).

Then, the system control unit 105 calculates a time required for changing the enlargement ratio from the reproduction composition fixed interval m+1 (522) to the reproduction composition fixed interval m+1 (523). The system control unit 105 sets, based on the calculated time, the ending point of the reproduction composition fixed interval m (522) and the starting point of the reproduction composition changing interval m (532). On this occasion, the system control unit 105 stores, into the RAM 111, the calculated time and a rate of change of the enlargement ratio required for image shake correction during reproduction.

In this way, the system control unit 105 performs control such that the rate of change of the enlargement ratio in a reproduction composition changing interval and the rate of change of the zoom magnification in a shooting composition changing interval cancel each other, so that the rate of change of the enlargement ratio of an output image in the reproduction composition changing interval become zero. For example, in the examples illustrated in FIGS. 9A and 9B, the rate of change of the enlargement ratio of an output image in the reproduction composition changing interval 532 becomes zero even though the zoom magnification is changing in the shooting composition changing interval 511.

In step S614, the system control unit 105 sets the ending point of the reproduction composition changing interval m (532) to the composition change starting time t2, which is time of the ending point of the shooting composition changing interval n (511).

Processing in steps S615 and S616 is described with reference to FIGS. 10A and 10B. Here, in step S612, the predetermined condition not being satisfied means the following events:

(G) A change in shooting composition in the shooting composition changing interval (the shooting composition changing interval 511) indicates the enlargement direction, i.e., zooming in the shooting composition changing interval advances from the wide-angle side to the telephoto side, and the maximum shake amount within the shooting composition changing interval n (the shooting composition changing interval 511) is larger than the maximum shake amount within the subsequent shooting composition fixed interval n (the shooting composition fixed interval 502); or (H) A change in shooting composition in the shooting composition changing interval (the shooting composition changing interval 511) indicates the reduction direction, i.e., zooming in the shooting composition changing interval advances from the telephoto side to the wide-angle side, and the maximum shake amount within the subsequent shooting composition fixed interval (the shooting composition fixed interval 502) is larger than the maximum shake amount within the shooting composition changing interval (the shooting composition changing interval 511).

In step S615, the system control unit 105 sets the starting point of the reproduction composition changing interval m (532), i.e., the ending point of the reproduction composition fixed interval m+1, to the composition change starting time t2, which is time of the ending point of the shooting composition changing interval n (511). In step S616, the system control unit 105 calculates the ending point of the reproduction composition changing interval m (532) and the starting point of the reproduction composition fixed interval m+2 (523).

More specifically, the system control unit 105 calculates a rate of change of composition per unit time in the shooting composition changing interval n (511). Then, the system control unit 105 acquires maximum shake amounts in the shooting composition changing interval n (511) and the shooting composition fixed interval n+1 (502). Then, the system control unit 105 obtains the enlargement ratio required for image shake correction in each of the reproduction composition fixed interval m+1 (523), which corresponds to the shooting composition changing interval n (511), and the reproduction composition fixed interval m+2 (523), which corresponds to the shooting composition fixed interval n+1 (502).

Then, the system control unit 105 calculates a time required for changing the enlargement ratio from the reproduction composition fixed interval m+1 (522) to the reproduction composition fixed interval m+2 (523). The system control unit 105 sets, based on the calculated time, the ending point of the reproduction composition changing interval m (532) and the starting point of the reproduction composition fixed interval m+2 (523). On this occasion, the system control unit 105 stores, into the RAM 111, the calculated time and a rate of change of the enlargement ratio required for image shake correction during reproduction.

In this way, the system control unit 105 performs control such that the rate of change of the enlargement ratio of an output image in a reproduction composition changing interval becomes equal to the rate of change of the enlargement ratio of an output image due to a change in zoom magnification in a shooting composition changing interval. For example, in the examples illustrated in FIGS. 10A and 10B, the rates of change of the enlargement ratio of an output image in the reproduction composition changing interval 532 and the shooting composition changing interval 511 become equal to each other.

In step S617, the system control unit 105 calculates and determines an output image range (composition) in the reproduction composition fixed interval m (521). To perform image shake correction during reproduction of a moving image, it is necessary to extract (cut out) an image within a predetermined range. The system control unit 105 enlarges (performs electronic zooming on) an image within the predetermined range to display the enlarged image as an output image on the display unit 115 or to record the enlarged image as a recording image on the recording medium 113.

The "predetermined range" is determined according to the maximum shake amount within the shooting composition fixed interval n. For example, when the shake amount is large, since it is necessary to move the image widely, the "predetermined range" becomes narrower compared with an imaging range. In addition, the system control unit 105 stores the calculated composition information into the RAM 111.

In step S618, the system control unit 105 sets a next reproduction composition fixed interval and a next reproduction composition changing interval as intervals to be processed. In step S619, the system control unit 105 sets a next shooting composition fixed interval and a next shooting composition changing interval as intervals to be processed. Then, the processing returns to step S603.

The above-described determination of a composition in the reproduction composition fixed interval m enables a moving image to be reproduced with an appropriate composition according to the magnitude of shaking. In addition, the detection of the relationship in magnitude between the shake amount in the reproduction composition fixed interval m and the shake amount in an interval before or after the reproduction composition fixed interval m enables a change in composition for image shake correction during reproduction to be continuous with a change in composition during shooting (zoom operation).

This can reduce any uncomfortable feeling given to the user, and enables a reproduction image stabilization (image shake correction during reproduction) with the most appropriate composition for each reproduction composition fixed interval.

FIG. 11 is a flowchart of image shake correction processing during reproduction. The system control unit 105 performs image shake correction during reproduction illustrated in FIG. 11 based on a result of the analysis for image shake correction illustrated in FIG. 6.

In step S2101, the system control unit 105 starts reproducing a moving image in response to an instruction issued by the user via the operation unit 105. The system control unit 105 loads, onto the frame memory 109 via the recording medium control unit 112, a moving image stored in the recording medium 113.

The image cut-out control unit 202 in the image shake correction unit 108 outputs a moving image stream, loaded on the frame memory 109, with a predetermined composition via the image cut-out unit 201. The enlargement ratio control unit 204 performs resolution conversion on the moving image stream via the enlargement processing unit 203 at the enlargement ratio specified by the system control unit 105. Then, the enlargement ratio control unit 204 loads the enlarged moving image stream onto the frame memory 109. The video information output unit 107, which serves as a video reproduction unit, displays image data, loaded on the frame memory 109, on the display unit 115.

In step S2102, the system control unit 105 performs image shake correction during reproduction. The shake information acquisition unit 206 acquires shake information associated with a moving image to be reproduced. The image cut-out unit 201 reads out image data from a predetermined position of the moving image stream, loaded on the frame memory 109, according to the acquired shake information.

The enlargement processing unit 203 performs resolution conversion processing on the read-out moving image stream at the enlargement ratio specified by the enlargement ratio control unit 204.

In this instance, the system control unit 105 performs control such that the rate of change of the enlargement ratio of an output image in a reproduction composition changing interval becomes equal to the rate of change of the enlargement ratio of an output image due to a change in zoom magnification during shooting (in a shooting composition changing interval). For example, in the examples illustrated in FIGS. 7A and 7B, the rates of change of the enlargement ratio of an output image in the reproduction composition changing interval 531 and the shooting composition changing interval 511 become equal to each other. Furthermore, in the examples illustrated in FIGS. 10A and 10B, the rates of change of the enlargement ratio of an output image in the reproduction composition changing interval 532 and the shooting composition changing interval 511 become equal to each other.

Alternatively, the system control unit 105 performs control such that the rate of change of the enlargement ratio in a reproduction composition changing interval and the rate of change of the zoom magnification in a shooting composition changing interval cancel each other, so that the rate of change of the enlargement ratio of an output image in the reproduction composition changing interval become zero. For example, in the examples illustrated in FIGS. 8A and 8B, the rate of change of the enlargement ratio of an output image in the reproduction composition changing interval 531 becomes zero even though the zoom magnification is changing in the shooting composition changing interval 511.

Alternatively, in the examples illustrated in FIGS. 9A and 9B, the rate of change of the enlargement ratio of an output image in the reproduction composition changing interval 532 becomes zero even though the zoom magnification is changing in the shooting composition changing interval 511.

In step S2103, the system control unit 105 determines whether the moving image has terminated. If the system control unit 105 determines that the moving image has not yet terminated (NO in step S2103), the processing proceeds to step S2104 to read a next frame.

In step S2104, the system control unit 105 determines whether the currently-reproduced frame is within the reproduction composition changing interval acquired by the composition change information acquisition unit 208. If the system control unit 105 determines that the currently-reproduced frame is within the reproduction composition changing interval (YES in step S2104), the processing proceeds to step S2105. If the system control unit 105 determines that the currently-reproduced frame is not within the reproduction composition changing interval (NO in step S2104), the processing returns to step S2102, in which the system control unit 105 performs image shake correction.

In step S2105, the system control unit 105 calculates and sets the enlargement ratio for image shake correction during reproduction of the currently-reproduced frame based on the times of the reproduction composition changing interval and a change in composition during reproduction (a change in enlargement ratio for image shake correction during reproduction), which are acquired in the process illustrated in the flowchart of FIG. 6.

As described above, the system control unit 105 analyzes a moving image stream and determines such a reproduction composition changing interval as to make a change in composition for image shake correction during reproduction continuous with a change in composition during shooting. Then, the system control unit 105 changes a composition during reproduction by changing the zoom magnification at an appropriate rate of change of composition in the reproduction composition changing interval. This can reduce any uncomfortable feeling given to the user, and enables performing image shake correction during reproduction with the most appropriate composition for each reproduction composition fixed interval.

The present exemplary embodiment is not limited to a case using only shake information acquired during shooting. For example, the present exemplary embodiment can also be arranged to perform optical image shake correction using a lens sifting method or the like and to correct, during reproduction of a moving image, an image shake (a remaining image shake) that has not been completely corrected by the optical image shake correction.

Figure 12:
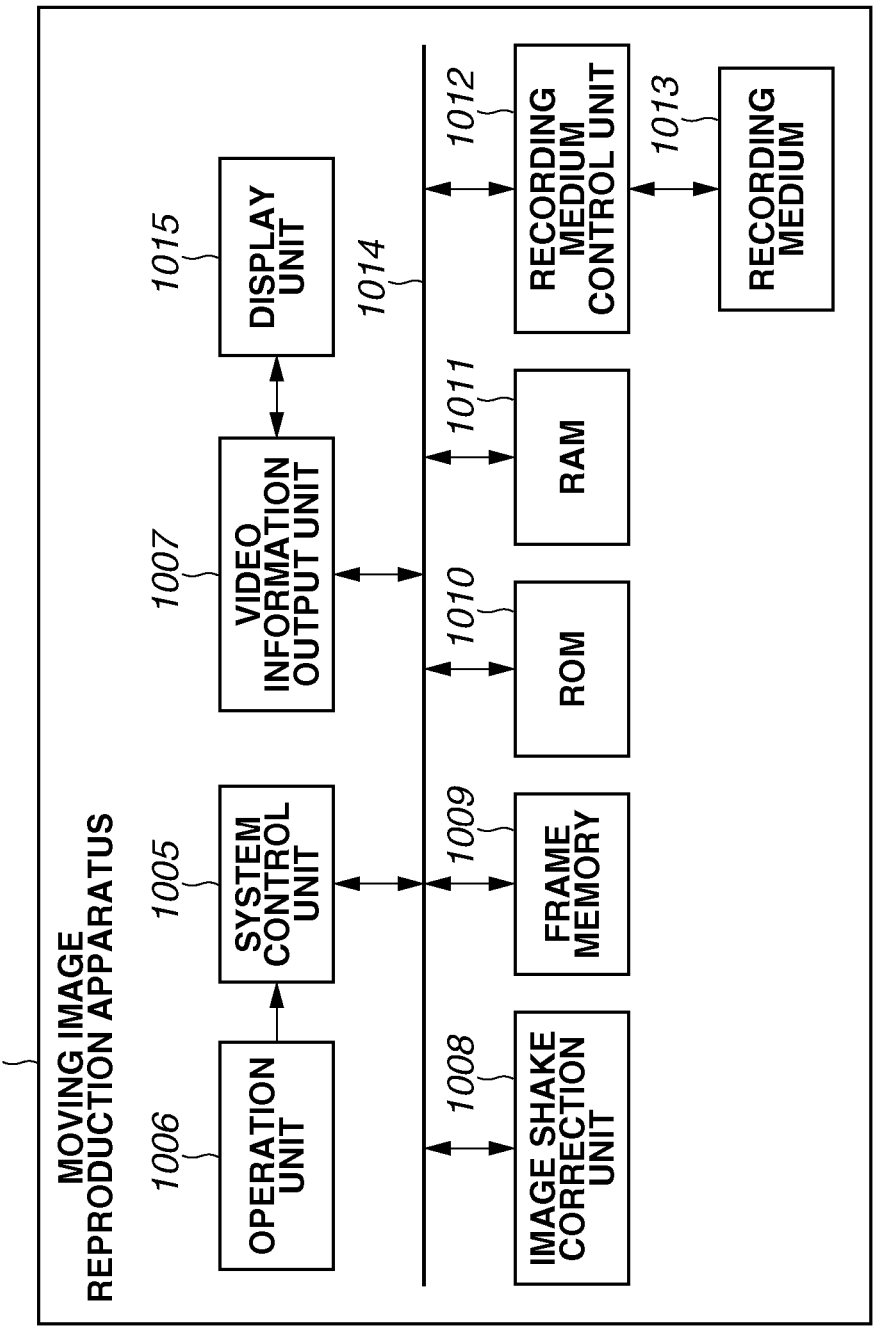
FIG. 12 is a block diagram of a moving image reproduction apparatus according to a second exemplary embodiment and a sixth exemplary embodiment of the present invention.

The above-described first exemplary embodiment has been described with an apparatus having a moving image shooting function and configured to acquire, during shooting, information usable for image shake correction and to perform image shake correction during reproduction using the acquired information. In a second exemplary embodiment of the present invention, the operation of an apparatus having only a moving image reproduction function without having a moving image shooting function is described with reference to FIG. 12. The configuration illustrated in FIG. 12 is almost similar to that illustrated in FIG. 1 except for some portions. Therefore, only different portions are described below.

FIG. 12 illustrates a configuration of a moving image reproduction apparatus 1000. The moving image reproduction apparatus 1000 includes a system control unit 1005, an operation unit 1006, a video information output unit 1007, and an image shake correction unit 1008.

The moving image reproduction apparatus 1000 further includes a frame memory 1009, a ROM 1010, a RAM 1011, a recording medium control unit 1012, a recording medium 1013, a bus 1014, and a display unit 1015.

The moving image reproduction apparatus 1000 according to the present exemplary embodiment performs operations similar to those of the video camera 100 described in the first exemplary embodiment except that the moving image reproduction apparatus 1000 has no moving image shooting function. Also, the image shake correction unit 1008 performs operations similar to those of the image shake correction unit 108 of the video camera 100 described in the first exemplary embodiment. While the shake detection unit 205 included in the image shake correction unit 108 of the video camera 100 described in the first exemplary embodiment includes a sensor that detects a displacement due to shaking of the video camera 100, such as an acceleration sensor, a shake detection unit 205 included in the image shake correction unit 1008 according to the present exemplary embodiment includes a motion vector detection unit (not illustrated) for a moving image stream.

The overall flow of image shake correction processing during reproduction of a moving image in the present exemplary embodiment is also similar to that in the video camera 100 described in the first exemplary embodiment. The video camera 100 described in the first exemplary embodiment acquires image shake correction information during shooting.

However, the moving image reproduction apparatus 1000 according to the present exemplary embodiment reproduces a moving image stream once, detects motion vectors from the currently-reproduced moving image stream, and acquires maximum shake amounts and shake information for each frame based on the detected motion vectors. Then, the moving image reproduction apparatus 1000 analyzes image shake correction information using the acquired information and performs image shake correction processing during reproduction. In the above-described way, the moving image reproduction apparatus 1000 can perform similar processing operations by acquiring the maximum shake amount within each interval and shake information for each frame based on motion vectors detected by the shake detection unit 205.

In the above-described exemplary embodiments, shake information is detected during shooting or reproduction of a moving image. However, in a case where optical image shake correction is performed using a lens sifting method or the like, an image shake (a remaining image shake) that has not been completely corrected by the optical image shake correction may be corrected by the image shake correction during reproduction according to the above-described exemplary embodiments.

In the above-described exemplary embodiments, the configurations for performing image shake correction during reproduction of a moving image have been described.

In a third exemplary embodiment of the present invention, operations in a case where the analysis of image shake correction information, the determination of a cut-out range, and the image shake correction processing are performed on a recording image during shooting of a moving image are described below.

An apparatus according to the third exemplary embodiment has a hardware configuration similar to that of the video camera 100 in the first exemplary embodiment illustrated in FIG. 1, but differs from that in an operation for camera shooting.

The system control unit 105 performs a shooting operation for storing, into the frame memory 109, a video signal output from the camera signal processing unit 104 as a moving image stream having a plurality of frames and analyzing the stored video signal.

The system control unit 105 further performs a recording operation for inputting the stored video signal to the image shake correction unit 108 and recording the moving image stream subjected to image shake correction on the recording medium 113 via the recording medium control unit 112.

Thus, the system control unit 105 performs two operations. The shooting operation is performed at a predetermined cycle, but the recording operation is performed after information required for image shake correction processing is acquired.

Next, image shake correction according to the present exemplary embodiment is described with reference to the schematic diagram of FIG. 15, the flowchart of FIG. 13, and the flowchart of FIG. 14. To perform the shooting operation and the recording operation according to the present exemplary embodiment, the system control unit 105 divides a moving image stream into a plurality of intervals starting points of which are at the time of start of shooting, at the time of end of shooting, and at the time of a change in composition. First, a brief description is given with reference to FIG. 15 about how the system control unit 105 generates specific intervals. Next, the details of the flow of the shooting operation are described with reference to FIG. 13, and then the details of the flow of the recording operation are described with reference to FIG. 14.

Figure 15:
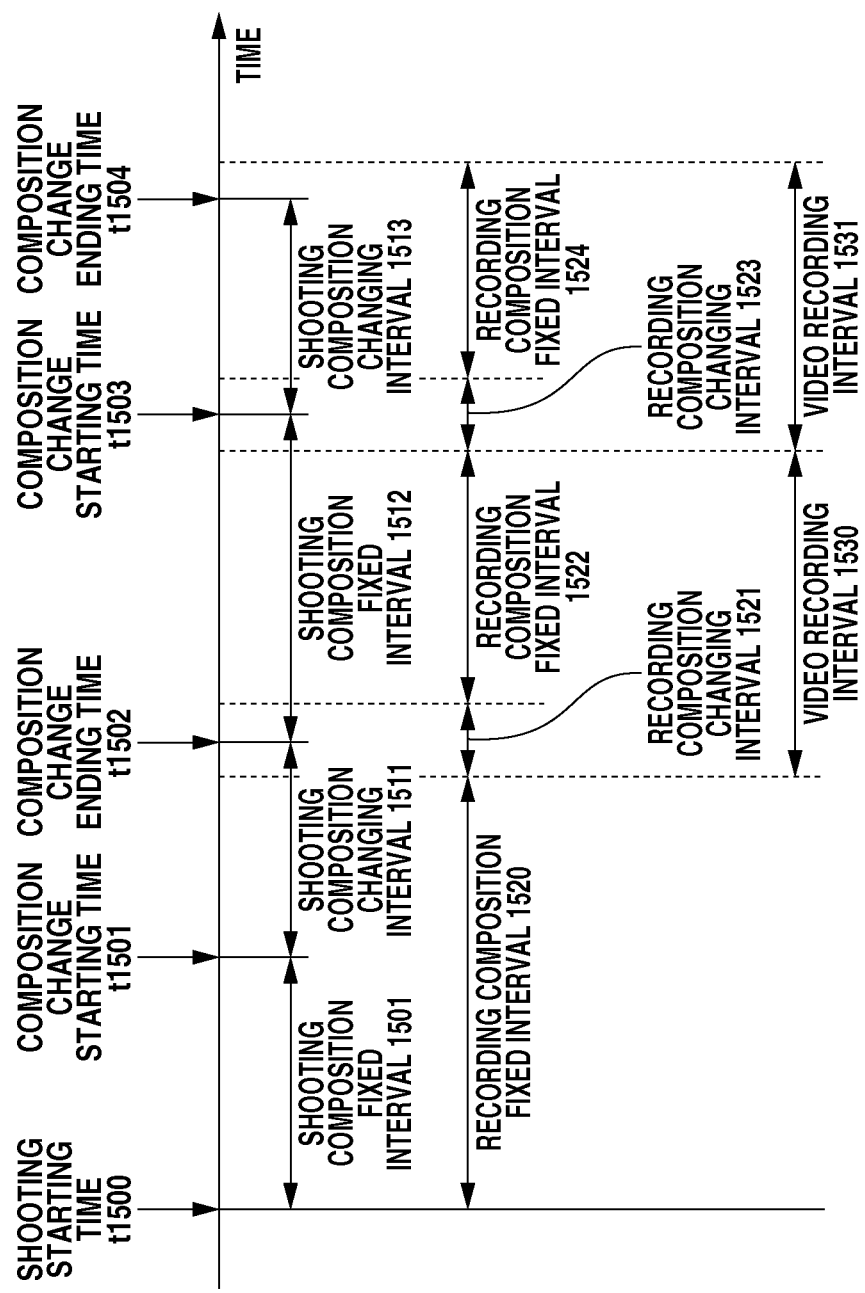
FIG. 15 is a schematic diagram illustrating a composition fixed interval and a composition changing interval according to the third exemplary embodiment.

The horizontal direction in FIG. 15 indicates a time axis as in FIG. 5. As the position in the horizontal direction moves to the right, time progresses. Shooting starting time t1500, composition change starting time t1501, composition change ending time t1502, composition change starting time t1503, and composition change ending time t1504 are respectively equivalent to times t0 to t4 in FIG. 5. A recording composition fixed interval (1520, 1522, 1524) and a recording composition changing interval (1521, 1523) respectively correspond to the reproduction composition fixed interval and the reproduction composition changing interval in FIG. 5. The system control unit 105 determines starting and ending times of the recording composition fixed interval and the recording composition changing interval according to the relationship in magnitude between the maximum shake amounts within the shooting composition fixed interval (1510, 1512) and the shooting composition changing interval (1511, 1513) and the direction of zooming during shooting.

The algorithm for determination is similar to that for the reproduction composition fixed interval and the reproduction composition changing interval in the first exemplary embodiment. A video recording interval (1530, 1531) is an interval during which to perform image shake correction processing on a video signal stored in the frame memory 109 and to record the video signal subjected to image shake correction on the recording medium 113. The video recording interval is generated every time the recording composition fixed interval is switched to the recording composition changing interval.

Figure 13:
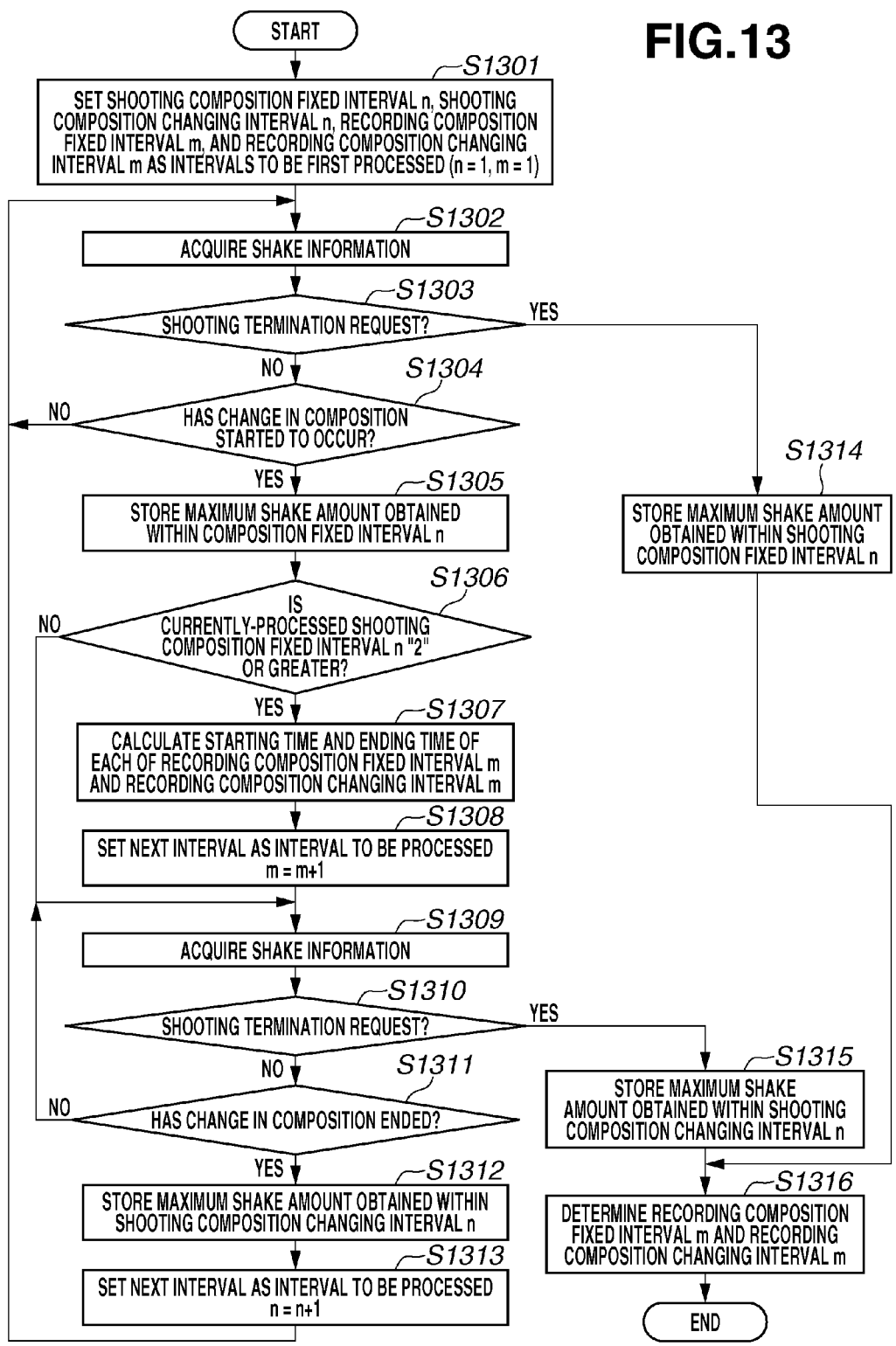
FIG. 13 is a flowchart of a shooting operation according to a third exemplary embodiment of the present invention.

FIG. 13 is a flowchart illustrating the shooting operation for acquiring image shake correction information, analyzing image shake correction information, and determining a cut-out range.

In step S1301, the system control unit 105 starts shooting of a moving image in response to a shooting start instruction from the user operating the operation unit 106. After starting shooting of the moving image, the system control unit 105 stores a video signal output from the image sensor 102 into the frame memory 109 via the camera signal processing unit 104. The video signal is stored in consecutive regions of the frame memory 109 as serial frame images.

When starting shooting, the system control unit 105 generates a shooting composition fixed interval 1 (n=1), a shooting composition changing interval 1 (n=1), a recording composition fixed interval 1 (m=1), and a recording composition changing interval 1 (m=1). Then, the system control unit 105 sets the shooting composition fixed interval 1 as an interval to be processed.

In step S1302, the shake detection unit 205 included in the image shake detection unit 108 acquires shake information with respect to all frames in the process of shooting. Then, the system control unit 105 stores, into the RAM 111, the direction of shaking and the shake amount together with time at which shaking has occurred.

In step S1303, the system control unit 105 determines whether a shooting termination request has been issued by the user operating the operation unit 106. If the system control unit 105 determines that the shooting termination request has been issued (YES in step S1303), the processing proceeds to step S1314. In step S1314, the system control unit 105 sets an interval lasting until the shooting termination request has been issued as a shooting composition fixed interval n, and stores, into the RAM 111, the maximum shake amount within the shooting composition fixed interval n. Then, the processing proceeds to step S1316. If the system control unit 105 determines that no shooting termination request has been issued (NO in step S1303), the processing proceeds to step S1304.

In step S1304, the system control unit 105 determines whether a change in composition has started to occur due to a zoom operation, panning, or the like, via the composition change detection unit 207 included in the image shake correction unit 108. If the system control unit 105 determines that no change in composition has started to occur (NO in step S1304), the processing returns to step S1302, in which the system control unit 105 acquires shake information. If the system control unit 105 determines that a change in composition has started to occur (YES in step S1304), the processing proceeds to step S1305.

In step S1305, the system control unit 105 stores, into the RAM 111, the maximum shake amount within the composition fixed interval n.

In step S1306, the system control unit 105 determines whether the currently-processed shooting composition fixed interval n is "2" or greater. If the system control unit 105 determines that the currently-processed shooting composition fixed interval n is "2" or greater (YES in step S1306), the processing proceeds to step S1307 for determining recording composition intervals. The reason for determining whether the currently-processed shooting composition fixed interval n is "2" or greater is that two shooting composition fixed intervals and one shooting composition changing interval are required to determine recording composition intervals. If the system control unit 105 determines that the currently-processed shooting composition fixed interval n is less than "2" (NO in step S1306), the processing proceeds to step S1309.

In step S1307, the system control unit 105 calculates starting time and ending time of each of the recording composition fixed interval m and the recording composition changing interval m. The recording composition fixed interval m is generated extending over the shooting composition fixed interval and the shooting composition changing interval. The recording composition changing interval m is generated before or after the shooting composition changing interval. The specific algorithm for calculation is similar to that for the reproduction composition fixed interval and the reproduction composition changing interval in the first exemplary embodiment. Therefore, the detailed description thereof is not repeated.

In step S1308, the system control unit 105 sets the next interval as an interval to be processed.

In step S1309, the system control unit 105 acquires shake information within the shooting composition changing interval via the shake detection unit 205, as in step S1302.

In step S1310, the system control unit 105 determines whether a shooting termination request has been issued by the user operating the operation unit 106. If the system control unit 105 determines that the shooting termination request has been issued (YES in step S1310), the processing proceeds to step S1315. In step S1315, the system control unit 105 sets an interval lasting until the shooting termination request has been issued as a shooting composition changing interval n, and stores, into the RAM 111, the maximum shake amount within the shooting composition changing interval n. Then, the processing proceeds to step S1316. If the system control unit 105 determines that no shooting termination request has been issued (NO in step S1310), the processing proceeds to step S1311.

In step S1311, the system control unit 105 determines whether a change in composition has ended due to the completion of the zoom operation, the completion of panning, or the like, via the composition change detection unit 207. If the system control unit 105 determines that the change in composition is continuing (NO in step S1311), the processing returns to step S1309, in which the system control unit 105 acquires shake information. If the system control unit 105 determines that the change in composition has ended (YES in step S1311), the processing proceeds to step S1312.

In step S1312, the system control unit 105 stores, into the RAM 111, the maximum shake amount within the shooting composition changing interval n.

In step S1313, the system control unit 105 sets the next interval as an interval to be processed. Then, the processing returns to step S1302.

In step S1316, the system control unit 105 determines the recording composition fixed interval m and the recording composition changing interval m as in step S1307. Then, the processing for analyzing a video signal ends.

Figure 14:
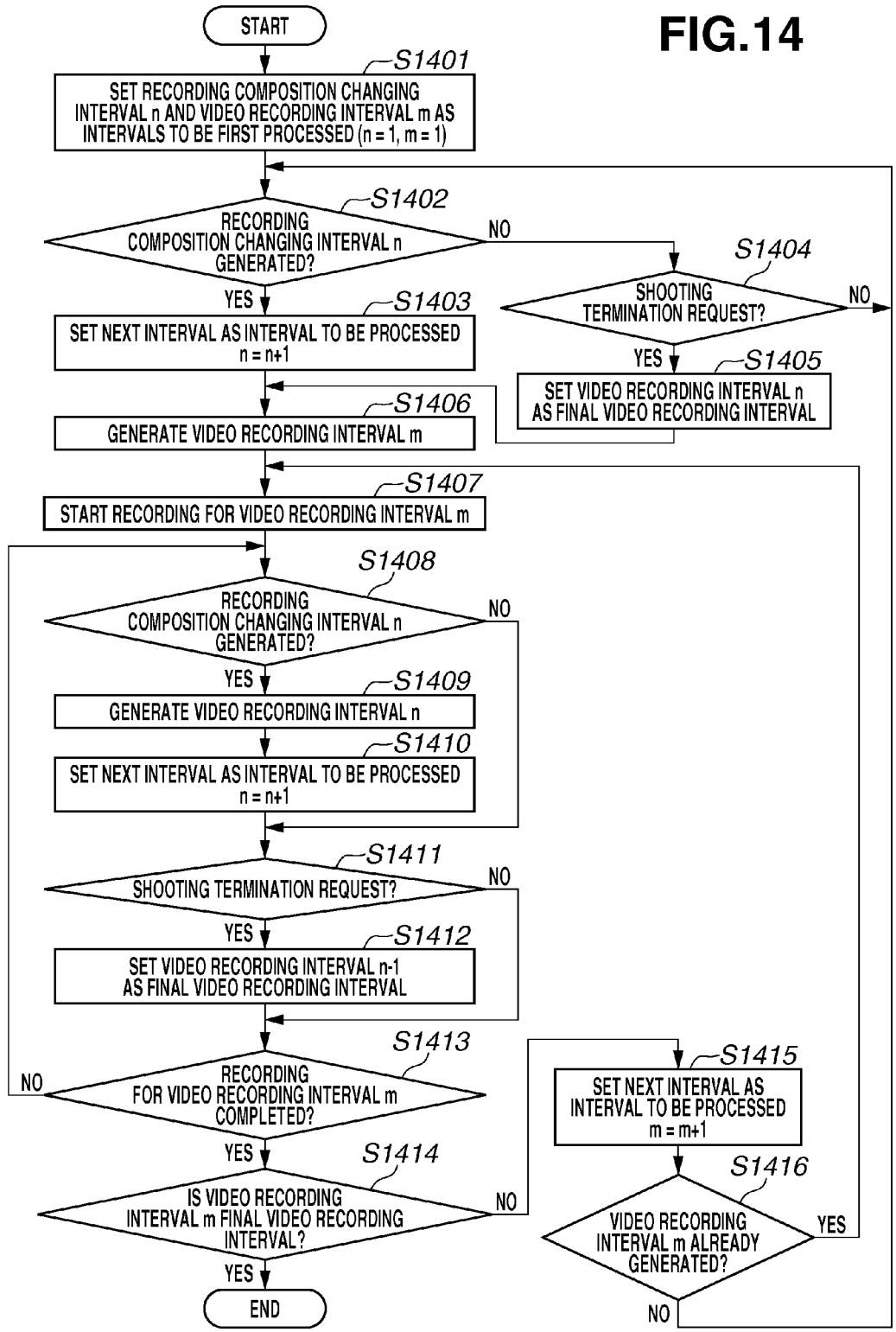
FIG. 14 is a flowchart of a recording operation according to the third exemplary embodiment.

FIG. 14 is a flowchart illustrating the recording operation for performing image shake correction processing and performing recording on the recording medium 113. The shooting operation illustrated in FIG. 13 and the recording operation illustrated in FIG. 14 start processing simultaneously. The recording operation is in a waiting state until a recording composition changing interval is generated in the process illustrated in FIG. 13, and starts processing when the recording composition changing interval is generated.

In step S1401, the system control unit 105 starts shooting of a moving image in response to a shooting start instruction from the user operating the operation unit 106. After starting shooting of the moving image, the system control unit 105 sets a recording composition changing interval 1 (n=1) and a video recording interval 1 (m=1) as intervals to be first processed, and waits for the recording composition changing interval n to be generated. The recording composition changing interval n is determined in steps S1307 and S1316 in the flowchart of FIG. 13.

In step S1402, the system control unit 105 determines whether the recording composition changing interval n has been generated in the process illustrated in FIG. 13. If the system control unit 105 determines that the recording composition changing interval n has been generated (YES in step S1402), the processing proceeds to step S1403. In step S1403, the system control unit 105 sets a next interval n+1 as the interval n to be processed. If the system control unit 105 determines that the recording composition changing interval n has not yet been generated (NO in step S1402), the processing proceeds to step S1404.

In step S1404, the system control unit 105 determines whether a shooting termination request has been issued by the user operating the operation unit 106. If the system control unit 105 determines that the shooting termination request has been issued (YES in step S1404), the processing proceeds to step S1405. In step S1405, the system control unit 105 stores, into the RAM 111, information indicating that the video recording interval n is set as a final video recording interval. Then, the processing proceeds to step S1406. If the system control unit 105 determines that no shooting termination request has been issued (NO in step S1404), the processing returns to step S1402, in which the system control unit 105 determines whether the recording composition changing interval n has been generated.

In step S1406, the system control unit 105 generates a video recording interval m. The video recording interval m is an interval during which video signals for the recording composition fixed interval n−1 and the recording composition changing interval n−1 are recorded. The video recording interval m is stored in the RAM 111.

The system control unit 105 calculates the enlargement ratio for image shake correction of each video signal in the video recording interval m based on shake information of video data to be recorded during the video recording interval m, the maximum shake amount within the recording composition fixed interval n−1, times in the recording composition changing interval n−1, and a change in composition during shooting.

In step S1407, the system control unit 105 performs image shake correction processing for the video recording interval m using the shake information and the enlargement ratio acquired in step S1406 and starts recording for the video recording interval m.

In step S1408, the system control unit 105 determines whether the recording composition changing interval n has been generated in the process illustrated in FIG. 13, as in step S1402. If the system control unit 105 determines that the recording composition changing interval n has been generated (YES in step S1408), the processing proceeds to step S1409. In step S1409, the system control unit 105 generates a new video recording interval n such that a video signal can be consecutively recorded after the completion of recording for the current video recording interval scheduled for recording. If the system control unit 105 determines that the recording composition changing interval n has not been generated (NO in step S1408), the processing proceeds to step S1411.

In step S1410, the system control unit 105 sets a next interval n+1 as the interval n to be processed, as in step S1403.

In step S1411, the system control unit 105 determines whether a shooting termination request has been issued by the user operating the operation unit 106, as in step S1404. If the system control unit 105 determines that the shooting termination request has been issued (YES in step S1411), the processing proceeds to step S1412. If the system control unit 105 determines that no shooting termination request has been issued (NO in step S1411), the processing proceeds to step S1413.

In step S1412, the system control unit 105 stores, into the RAM 111, information for setting the currently-generated last video recording interval n−1 as a final recording interval.

In step S1413, the system control unit 105 determines whether the current recording of a video signal for the video recording interval m is completed. If the system control unit 105 determines that the current recording of a video signal for the video recording interval m is completed (YES in step S1413), the processing proceeds to step S1414. If the system control unit 105 determines that the current recording of a video signal for the video recording interval m is not yet completed (NO in step S1413), the processing returns to step S1408.

In step S1414, the system control unit 105 retrieves final interval information from the RAM 111 and determines whether the video recording interval m for which recording has been completed is a final video recording interval. If the system control unit 105 determines that the video recording interval m is a final video recording interval (YES in step S1414), the processing for the recording operation ends. If the system control unit 105 determines that the video recording interval m is not a final video recording interval (NO in step S1414), the processing proceeds to step S1415.

In step S1415, the system control unit 105 sets a next interval m+1 as the interval m to be processed.

In step S1416, the system control unit 105 determines whether the video recording interval m has already been generated. If the system control unit 105 determines that the video recording interval m has already been generated (YES in step S1416), the processing returns to step S1407, in which the system control unit 105 starts recording for the video recording interval m. If the system control unit 105 determines that the video recording interval m has not yet been generated (NO in step S1416), the processing returns to step S1402, in which the system control unit 105 waits for generation of a recording composition changing interval or issuance of a shooting termination request and thus waits for a new video recording interval to be generated.

The system control unit 105 stores, into a memory (the RAM 111), a video signal obtained by the above-described shooting operation together with a result of analysis of the video signal, and performs image shake correction processing after a recording composition changing interval is determined. Accordingly, the present invention can also apply to operations during shooting of a moving image.

The present invention is also applicable to moving image reproduction apparatuses, such as a digital camera, a video camera, and a recorder, and apparatuses capable of reproducing a moving image, such as a mobile phone, a smartphone, and a personal computer. In addition, a storage medium storing program code of software for implementing the functions of the above-described exemplary embodiments can be supplied to a computer or an apparatus.

A control unit of the computer or the apparatus can read out and execute program code stored in the storage medium to implement the functions of the above-described exemplary embodiments. The control unit of the computer or the apparatus corresponds to, for example, a system control unit, a central processing unit (CPU), or a micro processing unit (MPU).

In this case, the program code itself read out from the storage medium implements the functions of the above-described exemplary embodiments, and the storage medium storing program code of software for implementing the functions of the above-described exemplary embodiments can constitute the present invention.

The storage medium for supplying the program code includes, for example, a flexible disk, a hard disk, an optical disc, a magneto-optical disc, a compact disc (CD)-ROM, a CD-R, a digital versatile disc (DVD)-ROM, a magnetic tape, a non-volatile memory card, and a ROM.

FIG. 1 also illustrates a configuration example of a video camera 100, serving as a moving image reproduction apparatus capable of recording and reproducing a moving image, according to a fourth exemplary embodiment of the present invention.

FIGS. 1 to 3, which are described in the first exemplary embodiment, also apply to the fourth exemplary embodiment, and, therefore, the description thereof is not repeated.

<Acquisition of Image Shake Correction Information>

The details of the acquisition of image shake correction information performed by the system control unit 105 are described below with reference to the flowchart of FIG. 4 and the schematic diagram of FIG. 16. Image shake correction information referred to in the present exemplary embodiment indicates starting and ending times of a composition fixed interval, starting and ending times of a composition changing interval, maximum shake amounts within the respective intervals, and the shake amounts in the horizontal and vertical directions of shaking in a frame at each time.

To perform image shake correction during reproduction according to the present exemplary embodiment, the system control unit 105 divides a moving image stream into a plurality of intervals starting points of which are at the time of start of shooting and at the time of a change in composition. First, a brief description is given with reference to FIG. 16 about how the system control unit 105 generates specific intervals.

Figure 16:
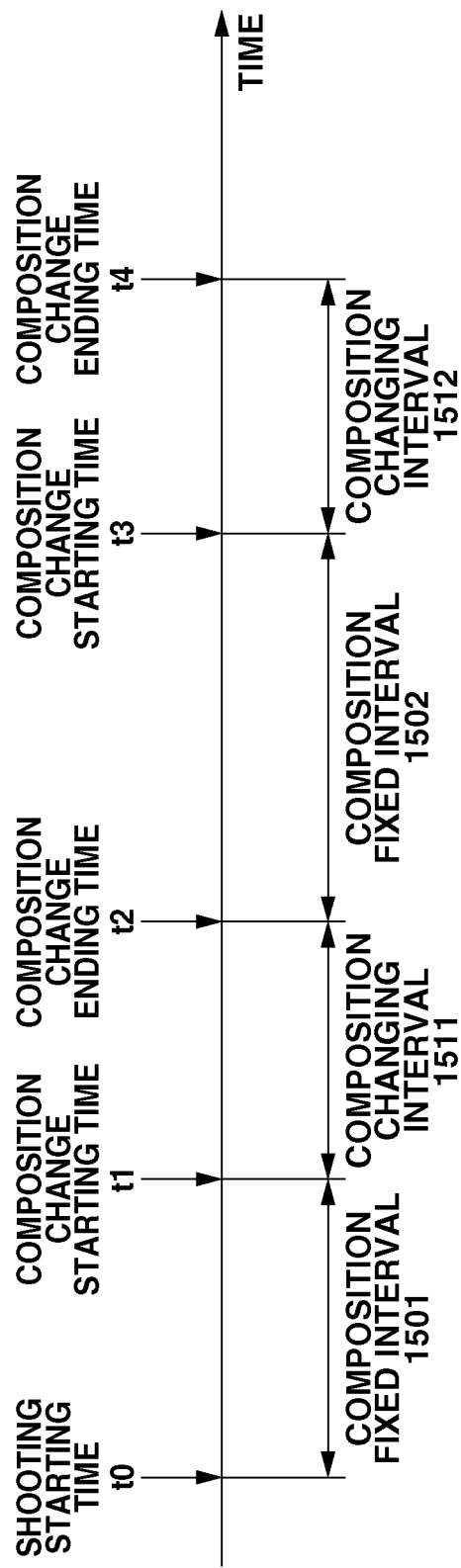
FIG. 16 is a schematic diagram illustrating a composition fixed interval and a composition changing interval according to a fourth exemplary embodiment of the present invention.

The horizontal direction in FIG. 16 indicates a time axis. As the position in the horizontal direction moves to the right, time progresses. Referring to FIG. 16, an interval from shooting starting time t0, at which shooting of a moving image starts, to composition change starting time t1, at which a change in composition due to a zoom operation or panning during shooting starts, is referred to as a composition fixed interval 1501.

An interval from the composition change starting time t1 to composition change ending time t2, at which a change in composition due to a zoom operation or panning during shooting ends, is referred to as a composition changing interval 1511.

Subsequently, an interval from the composition change ending time t2 to composition change starting time t3 is referred to as a composition fixed interval 1502.

An interval from the composition change fixed time t3 to composition change ending time t4 is referred to as a composition changing interval 1512. In this way, the system control unit 105 alternately adds a composition fixed interval and a composition changing interval until shooting is terminated.

Next, a method for acquiring the image shake correction information is described with reference to the flowchart of FIG. 4.

In step S401, the system control unit 105 starts shooting of a moving image in response to a shooting start instruction from the user operating the operation unit 106. When starting shooting, the system control unit 105 generates a composition fixed interval 1 (n=1). Then, the system control unit 105 sets the composition fixed interval 1 as an interval to be processed.

In step S402, the shake detection unit 205 included in the image shake detection unit 108 acquires shake information with respect to all frames in the process of shooting. Then, the system control unit 105 records, on the recording medium 113 via the recording medium control unit 112, the direction of shaking and the shake amount (the magnitude of a motion vector) together with time at which shaking has occurred. In the present exemplary embodiment, the system control unit 105 records the maximum shake amount within the same composition fixed interval on the RAM 111.

In step S403, the system control unit 105 determines whether a shooting termination request has been issued by the user operating the operation unit 106. If the system control unit 105 determines that the shooting termination request has been issued (YES in step S403), the processing proceeds to step S411 to perform end processing. In step S411, the system control unit 105 sets an interval lasting until the shooting termination request has been issued as a composition fixed interval n, and records, on the RAM 111, the maximum shake amount within the composition fixed interval n. If the system control unit 105 determines that no shooting termination request has been issued (NO in step S403), the processing proceeds to step S404.

In step S404, the system control unit 105 determines whether a change in composition has started to occur due to a zoom operation, panning, or the like, via the composition change detection unit 207 included in the image shake correction unit 108. If the system control unit 105 determines that no change in composition has started to occur (NO in step S404), the processing returns to step S402, in which the system control unit 105 acquires shake information.

If the system control unit 105 determines that a change in composition has started to occur (YES in step S404), the processing proceeds to step S405. In step S405, the system control unit 105 records, on the RAM 111, the maximum shake amount within the composition fixed interval n. More specifically, when a composition fixed interval has ended and a composition changing interval has started, the system control unit 105 records, on the RAM 111, the maximum shake amount within the composition fixed interval n. In step S406, the system control unit 105 acquires shake information within the composition changing interval as in step S402.

In step S407, the system control unit 105 determines whether a shooting termination request has been issued by the user operating the operation unit 106. If the system control unit 105 determines that the shooting termination request has been issued (YES in step S407), the processing proceeds to step S412. In step S412, the system control unit 105 sets an interval lasting until the shooting termination request has been issued as a composition changing interval n, and records, on the RAM 111, the maximum shake amount within the composition changing interval n. Then, the processing ends.

In step S408, the system control unit 105 determines whether a change in composition has ended due to the completion of the zoom operation, the completion of panning, or the like, via the composition change detection unit 207. If the system control unit 105 determines that the change in composition is continuing (NO in step S408), the processing returns to step S406, in which the system control unit 105 acquires shake information. If the system control unit 105 determines that the change in composition has ended (YES in step S408), the processing proceeds to step S409. In step S409, the system control unit 105 records, on the RAM 111, the maximum shake amount within the composition changing interval n.

In step S410, the system control unit 105 adds "1" to the composition fixed interval n to obtain a composition fixed interval n+1 so as to set the next interval as an interval to be processed. Then, the processing returns to step S402, in which the system control unit 105 acquires shake information within the composition fixed interval n+1.

<Analysis of Image Shake Correction Information and Determination of Cut-Out Range>

Next, the analysis of image shake correction information and the determination of a cut-out range for image shake correction during reproduction of a moving image, which are performed by the system control unit 105, are described with reference to the flowchart of FIG. 17 and the timing chart of FIG. 19.

In image shake correction during reproduction according to the present exemplary embodiment, the system control unit 105 changes the size of the cut-out range for every interval of a moving image stream. In the present exemplary embodiment, a case is described where the system control unit 105 analyzes image shake correction information based on the maximum shake amounts recorded on the RAM 111, after the completion of shooting of a moving image. However, the system control unit 105 may analyze image shake correction information during shooting of a moving image.

In step S1601, the system control unit 105 initializes an image shake correction interval to be processed. More specifically, the system control unit 105 starts to set an image shake correction interval for which to determine the size of a cut-out range for image shake correction during reproduction of a moving image. In step S1602, the system control unit 105 sets a starting point of the image shake correction interval. More specifically, the system control unit 105 sets the starting point of the image shake correction interval to a starting point of the composition fixed interval n. For example, referring to FIG. 19, the system control unit 105 sets the starting point of an image shake correction interval 821 to the starting point of a composition fixed interval 1801.

In step S1603, the system control unit 105 determines whether a change in composition occurs in the currently-reproduced moving image stream. More specifically, to perform image shake correction during reproduction of a moving image according to the present exemplary embodiment, the system control unit 105 determines whether a change in composition occurs in a moving image stream to be reproduced relative to the currently-reproduced moving image stream, in other words, whether a subsequent composition changing interval is present. Then, the system control unit 105 determines a cut-out range for image shake correction during reproduction of a moving image based on whether the subsequent composition changing interval is present.

If the system control unit 105 determines that the subsequent composition changing interval (a composition changing interval n) is present (YES in step S1603), the processing proceeds to step S1604. If the system control unit 105 determines that no subsequent composition changing interval is present (NO in step S1603), the processing proceeds to step S1612.

In step S1604, the system control unit 105 determines whether a next composition fixed interval (a composition fixed interval n+1) is present. The case where no next composition fixed interval (composition fixed interval n+1) is present means that the moving image stream terminates at the end of the subsequent composition changing interval (the composition changing interval n). If the system control unit 105 determines that the next composition fixed interval (the composition fixed interval n+1) is present (YES in step S1604), the processing proceeds to step S1605. If the system control unit 105 determines that no next composition fixed interval is present (NO in step S1604), the processing proceeds to step S1613.

Figure 19:
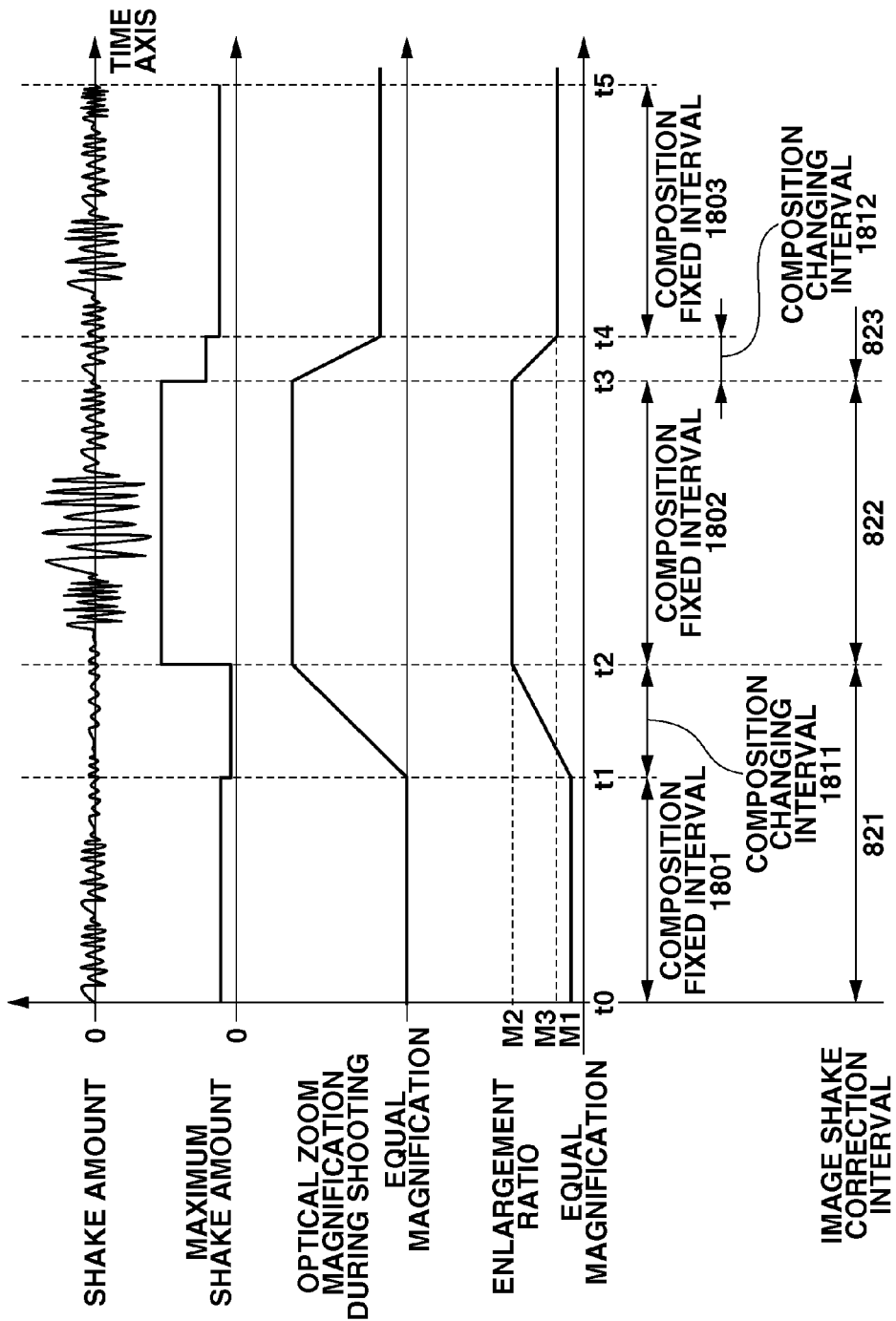
FIG. 19 is a timing chart illustrating an example of shake information and composition changing information of a moving image stream that is subjected to image shake correction processing according to the fourth exemplary embodiment.

For example, in the example illustrated in FIG. 19, the system control unit 105 determines that a next composition fixed interval 1802 is preset, and, therefore, the processing proceeds to step S1605.

In step S1605, the system control unit 105 makes a comparison in magnitude between the maximum shake amount within the next composition fixed interval and the maximum shake amount within the subsequent composition changing interval, and determines whether the maximum shake amount within the next composition fixed interval is larger than the maximum shake amount within the subsequent composition changing interval.

In other words, the system control unit 105 determines whether a condition of "the maximum shake amount within the composition fixed interval n+1" being larger than "the maximum shake amount within the composition changing interval n" is satisfied.

If the system control unit 105 determines that the maximum shake amount within the composition fixed interval n+1 is larger than the maximum shake amount within the composition changing interval n (YES in step S1605), the processing proceeds to step S1606.

On the other hand, if the system control unit 105 determines that the maximum shake amount within the composition changing interval n is larger than or equal to the maximum shake amount within the composition fixed interval n+1 (NO in step S160), the processing proceeds to step S1607.

In step S1606, the system control unit 105 sets the ending point of the image shake correction interval n to the ending point of the composition changing interval n. For example, referring to FIG. 19, since the maximum shake amount within the composition fixed interval 1801 is larger than the maximum shake amount within the composition changing interval 1811, the system control unit 105 sets the ending point of the image shake correction interval 821 to the ending point of the composition changing interval 1811. Thus, the image shake correction interval 821 extends from the starting point of the composition fixed interval 1801 to the ending point of the composition changing interval 1811.

On the other hand, in step S1607, the system control unit 105 sets the ending point of the image shake correction interval n to the ending point of the composition fixed interval n. For example, referring to FIG. 19, since the maximum shake amount within the composition changing interval 1812 is larger than the maximum shake amount within the composition fixed interval 1803, the system control unit 105 sets the ending point of the image shake correction interval 822 to the ending point of the composition fixed interval 1802. Thus, the image shake correction interval 822 extends from the starting point of the composition fixed interval 1802 to the ending point of the composition fixed interval 1802. Then, the system control unit 105 sets an image shake correction interval 823 to start with the starting point of the composition changing interval 1812 (to be described below in step S1611).

In step S1608, the system control unit 105 calculates the maximum shake amount obtained within the image shake correction interval n determined in step S1606 or S1607. For example, referring to FIG. 9, the system control unit 105 sets the maximum shake amount within the image shake correction interval n to the maximum shake amount within the composition fixed interval 1801.

Also, the system control unit 105 sets the maximum shake amount within the image shake correction interval 822 to the maximum shake amount within the composition fixed interval 1802, and sets the maximum shake amount within the image shake correction interval 823 to the maximum shake amount within the composition changing interval 1812.

In step S1609, the system control unit 105 determines an image shake correction range for the composition fixed interval n based on the shake amount calculated in step S1608. To perform image shake correction, the system control unit 105 cuts out (extracts) image data within a predetermined cut-out range from a moving image stream, performs enlargement processing on the cut-out image data via the enlargement processing unit 203 in the image shake correction unit 108, and outputs the processed image data via the video information output unit 107.

Then, the system control unit 105 performs image shake correction by changing the cut-out position based on the detected shake information. For that reason, the system control unit 105 determines the size and position of the cut-out range in such a way that a range cut out (extracted) from original image data does not protrude from the range of the original image data even when image shake correction is performed with respect to the maximum shake amount calculated in step S1608.

For example, referring to FIG. 19, the maximum shake amount within the image shake correction interval 821 is the maximum shake amount within the composition fixed interval 1801. Accordingly, the system control unit 105 determines the size and position of the cut-out range in such a way that a range cut out (extracted) from original image data does not protrude from the range of the original image data even when image shake correction is performed with respect to the maximum shake amount within the composition fixed interval 1801. Then, the system control unit 105 performs enlargement processing on image data cut out from within the determined cut-out range via the enlargement processing unit 203 in the image shake correction unit 108 based on the enlargement ratio (M1 in FIG. 19), and outputs the processed image data via the video information output unit 107.

In step S1610, the system control unit 105 terminates processing for the current image shake correction interval n, and performs determination processing for a next image shake correction interval. More specifically, the system control unit 105 adds "1" to the composition fixed interval n to obtain a composition fixed interval n+1 so as to set the next interval as an interval to be processed.

In step S1611, the system control unit 105 sets the starting point of the image shake correction interval n. The starting point of the image shake correction interval n corresponds to the ending point of the image shake correction interval n−1. For example, referring to FIG. 19, since the ending point of the image shake correction interval 822 is set to the ending point of the composition fixed interval 1802, the system control unit 105 sets the starting point of the image shake correction interval 823 to the starting point of the composition changing interval 1812.

The image shake correction interval n includes the composition fixed interval n. Whether to add the composition changing interval n−1 or the composition changing interval n to the image shake correction interval n is determined based on a result of the determination in step S1605. For example, referring to FIG. 19, the image shake correction interval 821 includes the composition fixed interval 1801 and the composition changing interval 1811. On the other hand, the image shake correction interval 822 includes only the composition fixed interval 1802 without any composition changing interval.

Processing in step S1612 is similar to that in step S1607. Processing in step S1613 is similar to that in step S1606. Processing in step S1614 is similar to that in step S1608. Processing in step S1615 is similar to that in step S1609. Therefore, the detailed description thereof is not repeated.

As described above, the video camera 100 divides a moving image stream into a plurality of intervals and determines a cut-out range for each interval, and, therefore, can reproduce a moving image with image data within a cut-out range appropriately set according to the magnitude of shaking for each interval. Furthermore, the video camera 100 makes a comparison in magnitude between the shake amounts within the respective successive intervals, and, therefore, can reproduce a moving image with image data within a more appropriately set cut-out range. In the flowchart of FIG. 17, even if the image shake correction interval n is always set to include the composition fixed interval n and the composition changing interval n, a moving image can be reproduced at a composition close to a range used during shooting.

<Image Shake Correction Processing During Reproduction of Moving Image>

Figure 18:
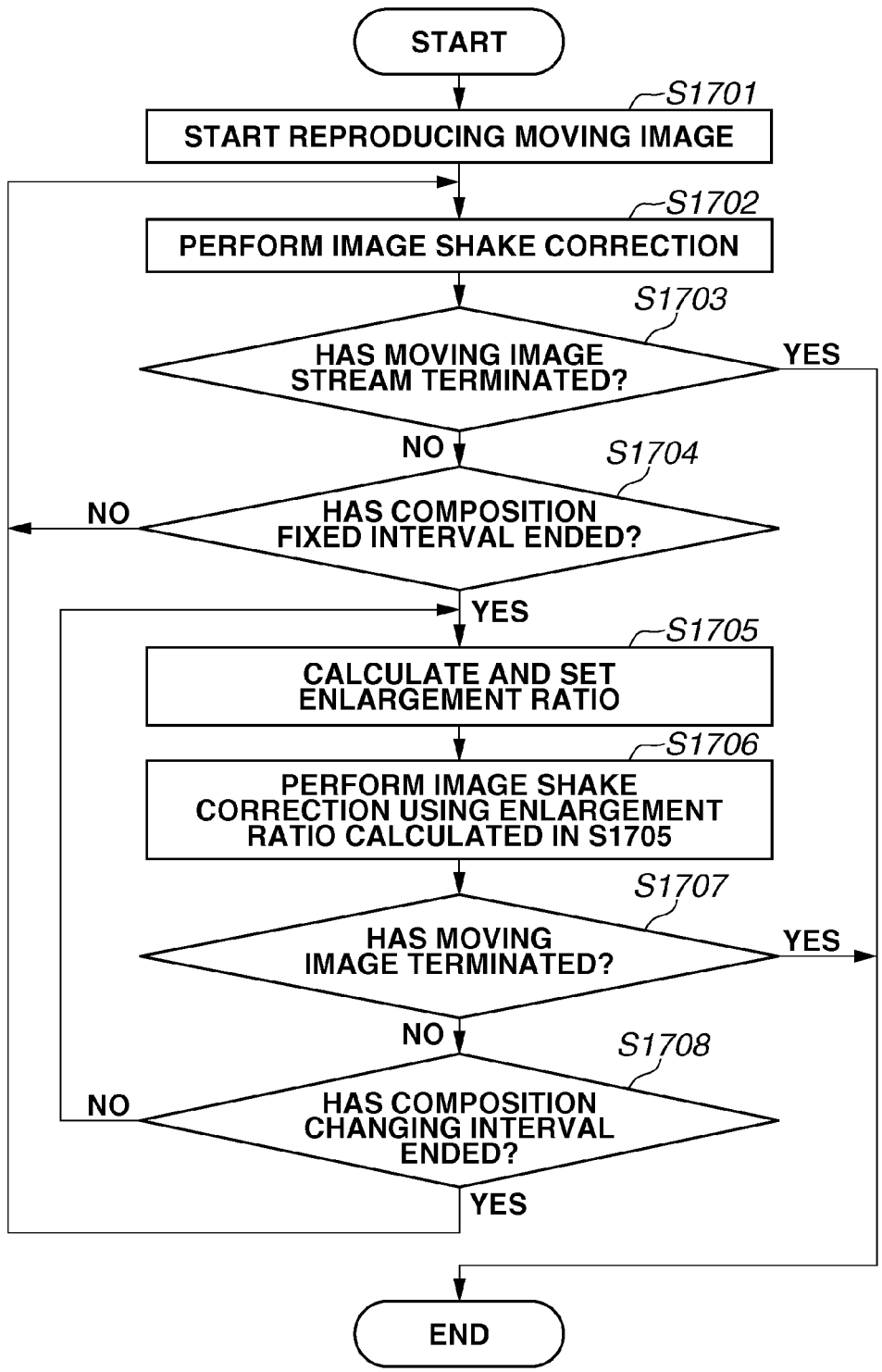
FIG. 18 is a flowchart of image shake correction processing during reproduction of a moving image according to the fourth exemplary embodiment.

Next, image shake correction processing during reproduction of a moving image is described with reference to the flowchart of FIG. 18 and the timing chart of FIG. 19.

FIG. 19 is a timing chart illustrating an example of a moving image stream. FIG. 19 illustrates, in graph form, shake information and temporal changes in composition change information when a moving image is shot via the video camera 100. In the example illustrated in FIG. 19, suppose that a change in composition occurs due to a zoom operation during shooting.

The timing chart of FIG. 19 indicates, beginning at the top, the shake amount during shooting of a moving image (the shake amount in each frame), the maximum shake amount within each interval, the optical zoom magnification during shooting, and the enlargement ratio for image shake correction during reproduction of the moving image, which are stored in a moving image stream. In FIG. 19, the horizontal axis indicates a time axis, t0 indicates shooting starting time, t1 and t3 each indicate composition change starting time due to an optical zoom operation during shooting, t2 and t4 each indicate composition change ending time due to the completion of an optical zoom operation during shooting, and t5 indicates shooting ending time. The maximum shake amount within each interval indicates the maximum shake amount within a composition fixed interval or a composition changing interval.

The optical zoom magnification during shooting illustrated in FIG. 19 indicates timing for starting and ending an optical zoom operation performed by the user operating the operation unit 106 during shooting and the zoom magnification at each time. The enlargement ratio for image shake correction during reproduction of a moving image illustrated in FIG. 19 is an enlargement ratio of image data used to convert, in resolution, image data within a cut-out range determined based on the maximum shake amount within each interval into a range (size) of image data to be output via the video information output unit 107. M1, M2, and M3 indicate the enlargement ratios of image data in the composition fixed intervals 1801, 1802, and 1803, respectively.

Image shake correction processing for reproducing a moving image stream such as that illustrated in FIG. 19 is described with reference to the flowchart of FIG. 18.

In step S1701, the system control unit 105 starts reproducing a moving image in response to the user operating the operation unit 106. The system control unit 105 controls the recording medium control unit 112 to store, into the frame memory 109, a moving image stream recorded on the recording medium 113. The image cut-out control unit 202 controls the image cut-out unit 201 to cut out (extract) image data within a predetermined cut-out range from image data stored in the frame memory 109.

Then, the enlargement processing unit 203 performs enlargement processing and resolution conversion at the magnification (magnification M1) specified by the enlargement ratio control unit 204, and stores the resolution-converted image data into the frame memory 109. The video information output unit 107 displays, on the display unit 115, image data loaded on the frame memory 109 (image data resolution-converted by the enlargement processing unit 203).

In step S1702, the system control unit 105 controls the shake information acquisition unit 206 in the image shake correction unit 108 to acquire, from the recording medium 113, shake information associated with a moving image stream to be reproduced. Then, the system control unit 105 controls the image cut-out control unit 202 to read out image data within a cut-out range determined according to the acquired shake information. The enlargement processing unit 203 performs resolution conversion processing on the read-out image data at the enlargement ratio specified by the enlargement ratio control unit 204 (the enlargement ratio corresponding to the cut-out range), and stores the processed image data into the frame memory 109.

In step S1703, the system control unit 105 determines whether the moving image stream has terminated. If the system control unit 105 determines that the moving image stream has not yet terminated (NO in step S1703), the processing proceeds to step S1704 to read a next frame. If the system control unit 105 determines that the moving image stream has terminated (YES in step S1703), the processing ends. In step S1704, the system control unit 105 determines whether the currently-reproduced frame is at composition change starting timing acquired by the composition change information acquisition unit 208. The composition change starting timing corresponds to time t1 or t3 in FIG. 19.

If the system control unit 105 determines that the currently-reproduced frame is at the composition change starting timing (YES in step S1704), the processing proceeds to step S1705. If the system control unit 105 determines that the currently-reproduced frame is not at the composition change starting timing (NO in step S1704), the processing returns to step S1702, in which the system control unit 105 performs image shake correction processing.

In step S1705, in the composition fixed interval, in which the size of a cut-out range is fixed, the system control unit 105 performs image shake correction using the initially set enlargement ratio, but, in the composition changing interval, the system control unit 105 sets the enlargement ratio for each frame. The enlargement ratio set in the composition changing interval is determined by the enlargement ratios (M1 and M2) in the composition fixed interval 1801, which is an interval immediately before the current composition changing interval (the composition changing interval 1811), and the composition fixed interval 1802, which is an interval next to the current composition changing interval, and a rate of change of the optical zoom magnification in the current composition changing interval 1811.

In the present exemplary embodiment, the enlargement ratio M1 is a video image enlargement ratio at which image data from a readout range (a first cut-out range) in the composition fixed interval 1801 is enlarged and displayed on the display unit 115. Also, the enlargement ratio M2 is a video image enlargement ratio at which image data from a readout range (a second cut-out range) in the composition fixed interval 1802 is enlarged and displayed on the display unit 115.

In the following description, suppose that the current timing is starting time t1 of the composition changing interval 1811 illustrated in FIG. 19.

When the composition changing interval 1811 is reached, the system control unit 105 acquires, via the composition change information acquisition unit 208, times t1 and t2 and enlargement ratios M1 and M2 of image data in the respective composition fixed intervals 1801 and 1802. Next, the system control unit 105 calculates a rate of change α of the enlargement ratio in the composition changing interval 1811 based on the following equation (1) using the times t1 and t2 and the enlargement ratios M1 and M2:

$$\alpha = (M2-M1)/(t2-t1) \qquad (1)$$

The system control unit 105 varies the enlargement ratio of image data in the composition changing interval 1811 at a constant rate using the rate of change α and a time elapsing from the start of the composition changing interval 1811.

In step S1706, the system control unit 105 performs image shake correction processing similar to that in step S1702. However, the enlargement ratio specified by the enlargement ratio control unit 204 in step S1706 is the one calculated in step S1705. In step S1707, the system control unit 105 determines whether the moving image stream has terminated. If the system control unit 105 determines that the moving image stream has not yet terminated (NO in step S1706), the processing proceeds to step S1708 to read a next frame. If the system control unit 105 determines that the moving image stream has terminated (YES in step S1707), the processing ends.

In step S1708, the system control unit 105 determines whether the currently-reproduced frame is at composition change ending timing acquired by the composition change information acquisition unit 208. The composition change ending timing corresponds to time t2 or t4 in FIG. 19. If the system control unit 105 determines that the currently-reproduced frame is at the composition change ending timing (YES in step S1708), the processing returns to step S1702, in which the system control unit 105 performs image shake correction processing. On the other hand, if the system control unit 105 determines that the currently-reproduced frame is not at the composition change ending timing (NO in step S1708), the processing returns to step S1705.

As described above, when a composition during shooting is fixed (in the composition fixed interval), the system control unit 105 does not change the size of a cut-out range, and, when a composition during shooting is changing due to an optical zoom operation or the like (in the composition changing interval), the system control unit 105 changes the size of a cut-out range. The system control unit 105 varies image data at a constant rate of change α of the enlargement ratio for image shake correction in the composition changing interval to change a composition during reproduction, thus reducing any uncomfortable feeling given to the user. This enables performing image shake correction at the size of a cut-out range most appropriate for each composition fixed interval.

In a fifth exemplary embodiment of the present invention, when the maximum shake amounts within the composition fixed intervals n and n+1, which are present before and after the composition changing interval n, are approximately the same, the enlargement ratios of the composition fixed intervals n and n+1 are also approximately the same.

Therefore, the present exemplary embodiment is configured not to change the cut-out range (enlargement ratio) in an interval between the composition fixed intervals n and n+1, thus preventing a large change in composition from occurring. The present exemplary embodiment is also implemented with the hardware configuration illustrated in FIG. 1, in which image shake correction information obtained through the control operation illustrated in FIG. 4 is used.

Figure 20:
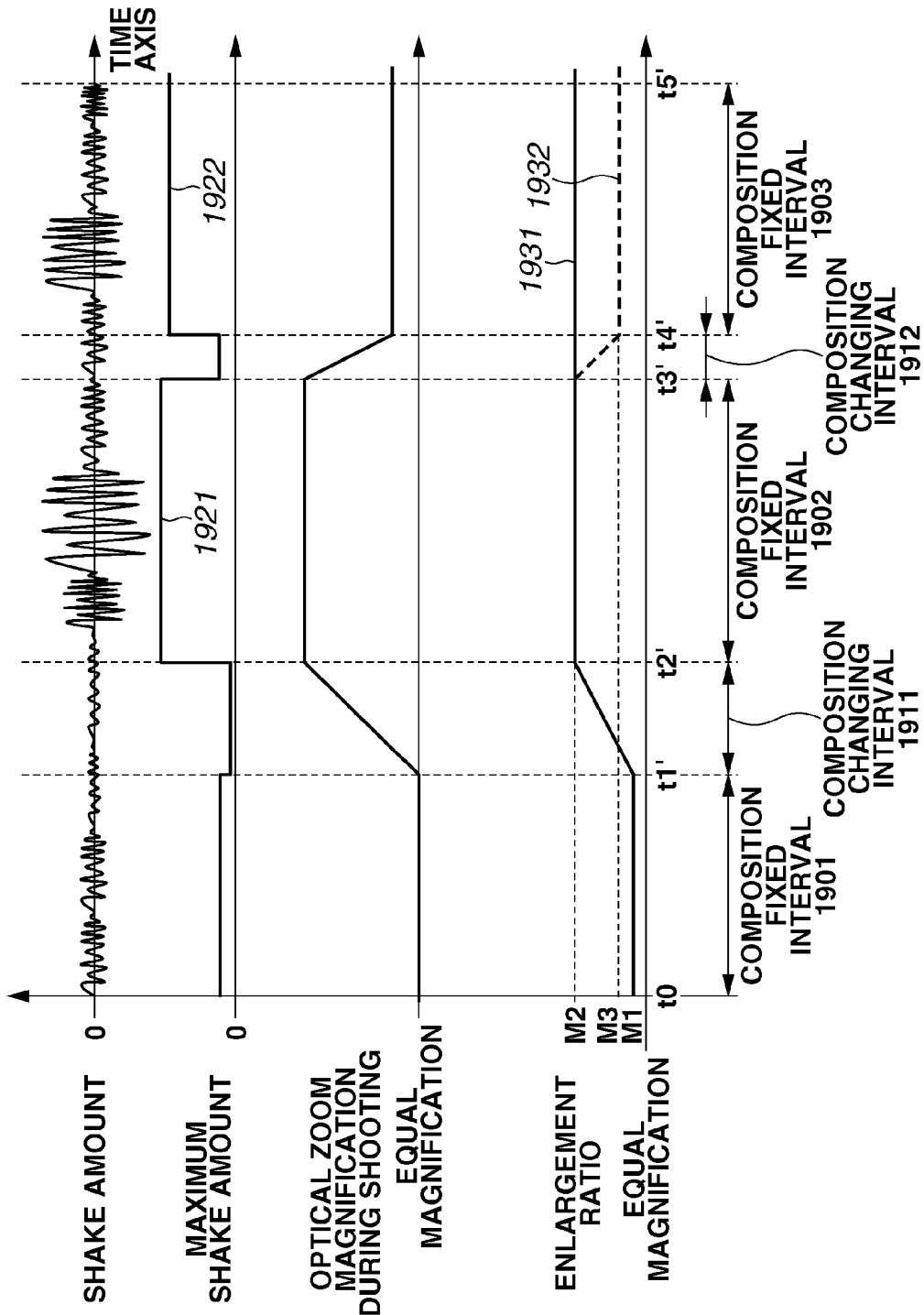
FIG. 20 is a timing chart illustrating an example of shake information and composition changing information of a moving image stream that is subjected to image shake correction processing according to a fifth exemplary embodiment of the present invention.

FIG. 20 is a conceptual diagram illustrating a control operation according to the present exemplary embodiment. Suppose that the enlargement ratios of the composition fixed intervals 1902 and 1903 are M2 and M3, respectively. In the case of the above-described fourth exemplary embodiment, when a change in composition occurs due to an optical zoom operation in a composition changing interval 1912 between the composition fixed intervals 1902 and 1903, the enlargement ratio is changed according to the change in composition, as indicated by the enlargement ratio 1932 in FIG. 20.

On the other hand, in the case of the present, fifth exemplary embodiment, a difference between the maximum shake amounts 1921 and 1922 within the respective composition fixed intervals 1902 and 1903 is a predetermined value or less.

In that case, the present exemplary embodiment is configured not to change the enlargement ratio in the composition changing interval 1912 between the composition fixed intervals 1902 and 1903, as indicated by the enlargement ratio 1931 in FIG. 20. Thus, the present exemplary embodiment performs image shake correction during reproduction at the enlargement ratio M2 even in the composition fixed interval 1903.

The predetermined value can be set to an arbitrary value, but is set to such a value as to keep image shake correction unaffected without having to changing the cut-out range (enlargement ratio).

when the maximum shake amounts within the composition fixed intervals n and n+1, which are present before and after the composition changing interval n, are approximately the same (a difference thereof is the predetermined value or less), the enlargement ratios of the composition fixed intervals n and n+1 are also approximately the same. Therefore, in the composition changing interval n, a change in composition occurs only due to the change of the optical zoom magnification. This can prevent an unnecessary change in composition from occurring due to enlargement or reduction for image shake correction.

In addition, a method for changing the enlargement ratio can be changed according to the direction of a change in the enlargement ratio. For example, in a case where the enlargement ratio increases from M3 to M2, since the image quality of image data after being enlarged deteriorates, the system control unit 105 does not change the cut-out range (enlargement ratio). On the other hand, in a case where enlargement ratio decreases from M2 to M3, the system control unit 105 can change the cut-out range (enlargement ratio) in such a direction as to enhance the image quality of image data.

Here, in a case where, in the composition fixed intervals n and n+2, which are present before and after the composition changing interval n, the enlargement ratio decreases even when a difference between the maximum shake amounts thereof is the predetermined value or less, the system control unit 105 changes the enlargement ratio. On the other hand, in a case where, in the composition fixed intervals n and n+2, which are present before and after the composition changing interval n, the enlargement ratio increases even when a difference between the maximum shake amounts thereof is the predetermined value or less, the system control unit 105 does not change the enlargement ratio.

Thus, in a case where the image quality deteriorates if the cut-out range is changed according to the change of the enlargement ratio, the system control unit 105 does not change the enlargement ratio. On the other hand, in a case where the image quality increases if the cut-out range is changed according to the change of the enlargement ratio, the system control unit 105 changes the enlargement ratio to perform appropriate image shake correction with the improved image quality.

The above-described fourth and fifth exemplary embodiments have been described with an apparatus having a moving image shooting function and configured to acquire, during shooting, information usable for image shake correction and to perform image shake correction during reproduction using the acquired information. In a sixth exemplary embodiment of the present invention, the operation of an apparatus having only a moving image reproduction function without having a moving image shooting function is described with reference to FIG. 12. The configuration illustrated in FIG. 12 is almost similar to that illustrated in FIG. 1 except for some portions. Therefore, only different portions are described.

FIG. 12 illustrates a configuration of a moving image reproduction apparatus 1000. The moving image reproduction apparatus 1000 includes a system control unit 1005, an operation unit 1006, a video information output unit 1007, an image shake correction unit 1008, and a frame memory 1009.

The moving image reproduction apparatus 1000 further includes a ROM 1010, a RAM 1011, a recording medium control unit 1012, a recording medium 1013, a bus 1014, and a display unit 1015.

The moving image reproduction apparatus 1000 according to the present exemplary embodiment performs operations similar to those of the video camera 100 described in the fourth exemplary embodiment except that the moving image reproduction apparatus 1000 has no moving image shooting function.

Also, the image shake correction unit 1008 performs operations similar to those of the image shake correction unit 108 of the video camera 100 described in the fourth exemplary embodiment. While the shake detection unit 205 included in the image shake correction unit 108 of the video camera 100 described in the fourth exemplary embodiment includes a sensor that detects a displacement due to shaking of the video camera 100, such as an acceleration sensor, a shake detection unit 205 included in the image shake correction unit 1008 according to the present exemplary embodiment includes a motion vector detection unit (not illustrated) for a moving image stream.

The overall flow of image shake correction processing during reproduction of a moving image in the present exemplary embodiment is also similar to that in the video camera 100 described in the fourth exemplary embodiment.

The video camera 100 described in the fourth exemplary embodiment acquires image shake correction information during shooting. However, the moving image reproduction apparatus 1000 according to the present exemplary embodiment reproduces a moving image stream once, and detects motion vectors from the currently-reproduced moving image stream.

The moving image reproduction apparatus 1000 acquires maximum shake amounts and shake information for each frame based on the detected motion vectors. Then, the moving image reproduction apparatus 1000 analyzes image shake correction information using the acquired information and performs image shake correction processing during reproduction.

In the above-described way, the moving image reproduction apparatus 1000 can perform similar processing operations by acquiring the maximum shake amount within each interval and shake information for each frame based on motion vectors detected by the shake detection unit 205.

In the above-described exemplary embodiments, shake information is detected during shooting or reproduction of a moving image. However, in a case where optical image shake correction is performed using a lens sifting method or the like, an image shake (a remaining image shake) that has not been completely corrected by the optical image shake correction may be corrected by the image shake correction during reproduction according to the above-described exemplary embodiments.

In the above-described exemplary embodiments, the configurations for performing image shake correction during reproduction of a moving image have been described.

In a seventh exemplary embodiment of the present invention, operations in a case where the analysis of image shake correction information, the determination of a cut-out range, and the image shake correction processing are performed on a recording image during shooting of a moving image are described below.

An apparatus according to the seventh exemplary embodiment has a hardware configuration similar to that of the video camera 100 in the fourth exemplary embodiment illustrated in FIG. 1, but differs from that in an operation for camera shooting.

The system control unit 105 performs a shooting operation for storing, into the frame memory 109, a video signal output from the camera signal processing unit 104 as a moving image stream having a plurality of frames and analyzing the stored video signal.

The system control unit 105 further performs a recording operation for inputting the stored video signal to the image shake correction unit 108 and recording the moving image stream subjected to image shake correction on the recording medium 113 via the recording medium control unit 112.

Thus, the system control unit 105 performs two operations. The shooting operation is performed at a predetermined cycle, but the recording operation is performed after information required for image shake correction processing is acquired.

Next, image shake correction according to the present exemplary embodiment is described with reference to the flowchart of FIG. 21 and the schematic diagram of FIG. 22.

Figure 22:
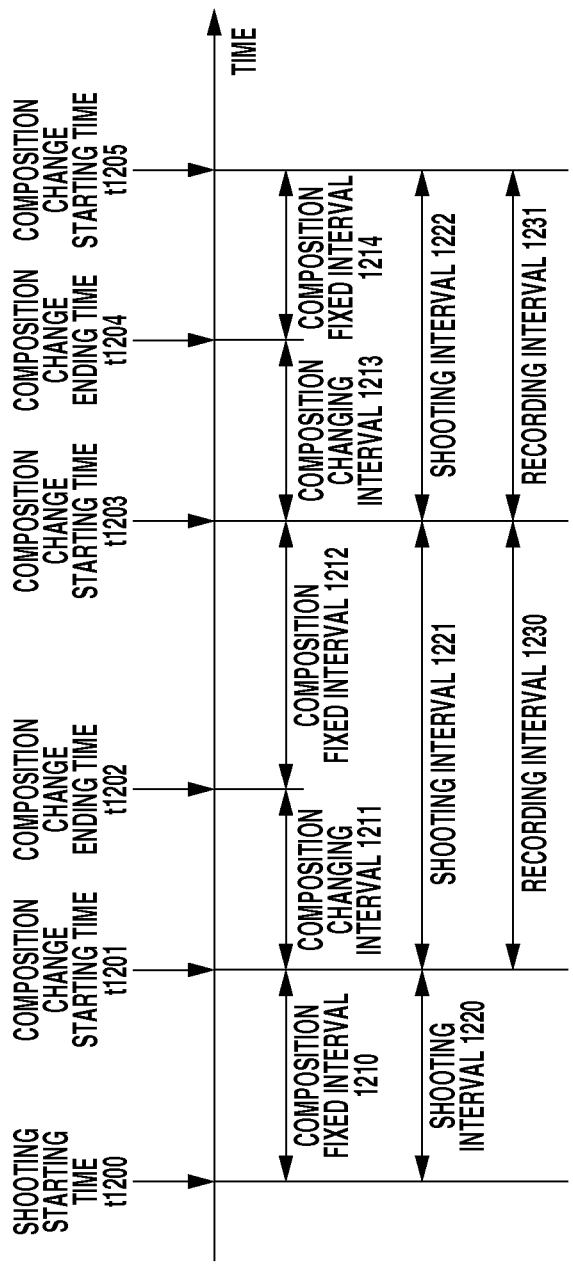
FIG. 22 is a schematic diagram illustrating a composition fixed interval and a composition changing interval according to the seventh exemplary embodiment.

The horizontal direction in FIG. 22 indicates a time axis as in FIG. 16. As the position in the horizontal direction moves to the right, time progresses. Shooting starting time t1200, composition change starting time t1201, composition change ending time t1202, composition change starting time t1203, composition change ending time t1204, and composition change starting time t1205 are respectively equivalent to times in FIG. 16. First, when the shooting starting time t1200 is reached, the system control unit 105 generates a shooting interval 1220. The system control unit 105 stores, into the frame memory 109, a video signal output from the camera signal processing unit 104 during the shooting interval 1220. when the composition change starting time t1201 is reached, the system control unit 105 generates a shooting interval 1221 and a recording interval 1230.

In the recording interval 1230, the system control unit 105 inputs, to the image shake correction unit 108, a video signal stored in the frame memory 109 during the shooting interval 1220. Subsequently, the system control unit 105 generates a shooting interval and a recording interval each time a change in composition occurs, and records a video signal obtained in a preceding shooting interval in a new generated recording interval.

Figure 21B:
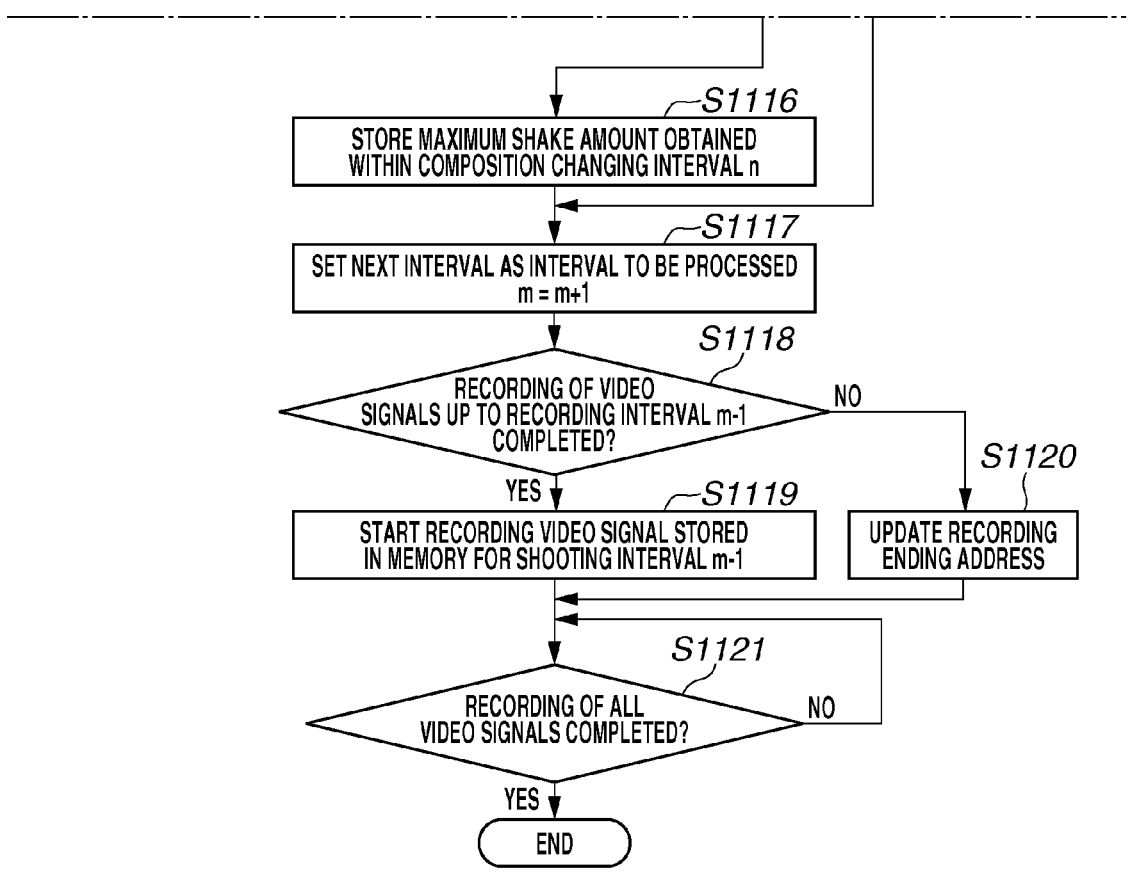
FIG. 21, which is composed of FIGS. 21A and 21B, is a flowchart of image shake correction processing according to a seventh exemplary embodiment of the present invention.

FIG. 21, which is composed of FIGS. 21A and 21B, is a flowchart illustrating the acquisition of image shake correction information, the analysis of image shake correction information, the determination of a cut-out range, and image shake correction processing according to the present exemplary embodiment.

In step S1101, the system control unit 105 starts shooting of a moving image in response to a shooting start instruction from the user operating the operation unit 106. After starting shooting of the moving image, the system control unit 105 stores a video signal output from the image sensor 102 into the frame memory 109 via the camera signal processing unit 104. The video signal is stored in consecutive regions of the frame memory 109 as serial frame images.

When starting shooting, the system control unit 105 generates a composition fixed interval 1 (n=1), a composition changing interval 1 (n=1), a shooting interval 1 (m=1), and a recording interval 1 (m=1). Then, the system control unit 105 sets the shooting composition fixed interval 1 and the shooting interval 1 as intervals to be processed.

In step S1102, the shake detection unit 205 included in the image shake detection unit 108 acquires shake information with respect to all frames in the process of shooting. Then, the system control unit 105 stores, into the RAM 111, the direction of shaking and the shake amount together with time at which shaking has occurred.

In step S1103, the system control unit 105 determines whether a shooting termination request has been issued by the user operating the operation unit 106. If the system control unit 105 determines that the shooting termination request has been issued (YES in step S1103), the processing proceeds to step S1115. In step S1115, the system control unit 105 sets an interval lasting until the shooting termination request has been issued as a composition fixed interval n, and stores, into the RAM 111, the maximum shake amount within the composition fixed interval n. Then, the processing proceeds to step S1117. If the system control unit 105 determines that no shooting termination request has been issued (NO in step S1103), the processing proceeds to step S1104.

In step S1104, the system control unit 105 determines whether a change in composition has started to occur due to a zoom operation, panning, or the like, via the composition change detection unit 207 included in the image shake correction unit 108. If the system control unit 105 determines that no change in composition has started to occur (NO in step S1104), the processing returns to step S1102, in which the system control unit 105 acquires shake information. If the system control unit 105 determines that a change in composition has started to occur (YES in step S1104), the processing proceeds to step S1105.

In step S1105, the system control unit 105 generates a new shooting interval and a recording interval, and sets the next interval as an interval to be processed.

In step S1106, the system control unit 105 stores, into the RAM 111, the maximum shake amount within the composition fixed interval n.

Figure 17:
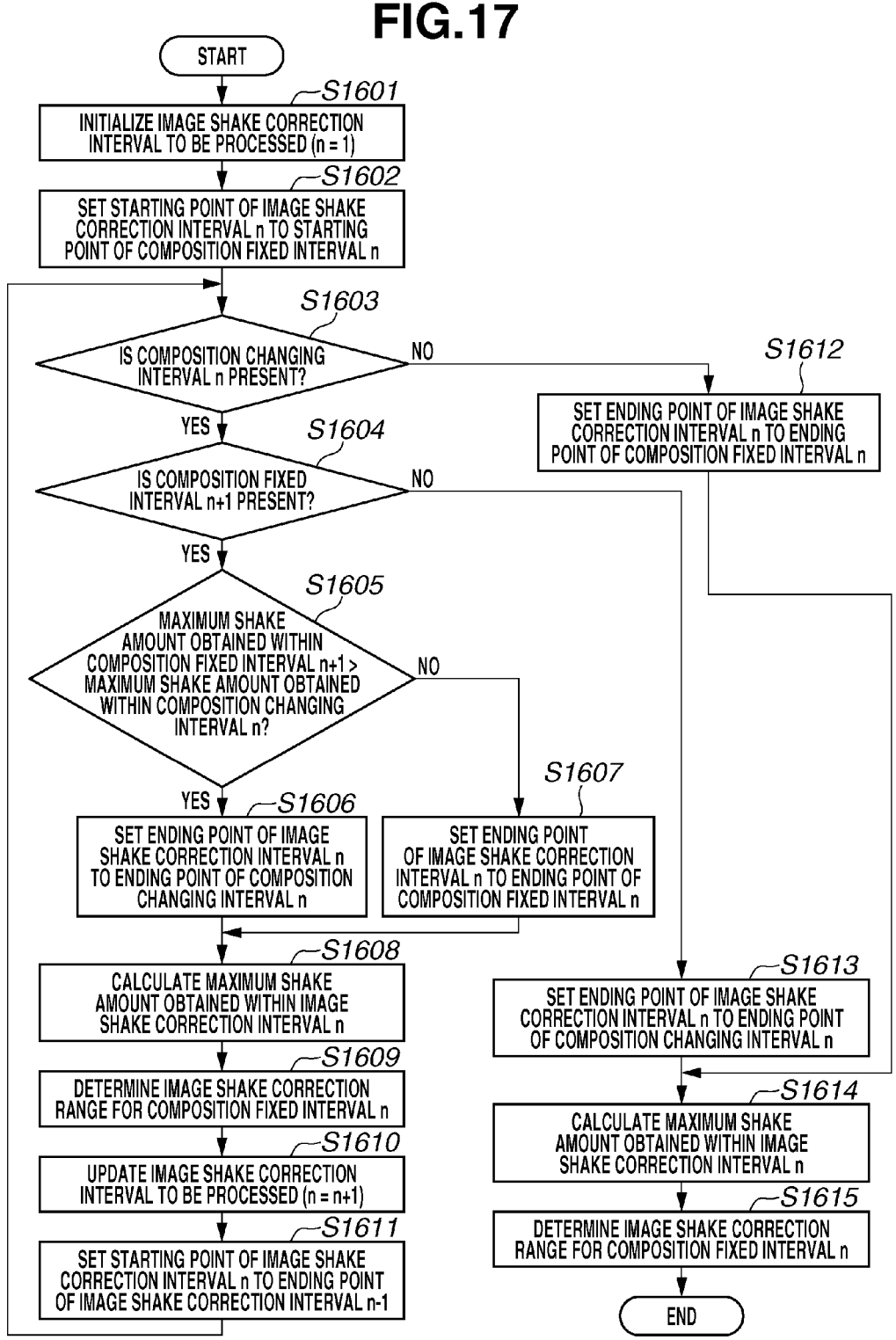
FIG. 17 is a flowchart of image shake correction information analytical processing according to the fourth exemplary embodiment.

Further, the system control unit 105 determines the cut-out range in each of a composition fixed interval and a composition changing interval that are included in the shooting interval m−1, in a manner similar to that described in the fourth exemplary embodiment illustrated in the flowchart of FIG. 17. Thus, the system control unit 105 checks for the relationship in magnitude between the maximum shake amounts within the composition fixed interval and the composition changing interval that are included in the shooting interval m−1, and determines the cut-out range in each of the composition fixed interval and the composition changing interval.

In step S1107, the system control unit 105 determines whether recording of all video signals obtained up to the recording interval m−1 on the recording medium 113 has been completed. If the system control unit 105 determines that recording of all the video signals has been completed (YES in step S1107), the processing proceeds to step S1108. If the system control unit 105 determines that recording of all the video signals has not yet been completed (NO in step S1107), the processing proceeds to step S1109. At this time, the recording interval 0 is not present. Therefore, when the processing enters step S1107 for the first time, the processing proceeds to step S1108.

In step S1118, the system control unit 105 inputs, to the image shake correction unit 108, a video signal stored in the frame memory 109 for the shooting interval m−1, and starts recording the video signal subjected to image shake correction on the recording medium 113. Here, the system control unit 105 sets the cut-out range determined in step S1106 to the image cut-out unit 201. Further, the image shake correction unit 108 acquires image shake correction information from the RAM 111 via the shake information acquisition unit 206, and performs image shake correction processing based on the obtained information. When the first frame and the last frame shot for the shooting interval m−1 are specified by the system control unit 105, the image shake correction unit 108 sequentially reads frames. The image shake correction unit 108 then reads shake information acquired for the shooting interval m−1 and performs image shake correction using the shake information corresponding to the read frame. Then, the image shake correction unit 108 ends the recording operation after the completion of recording of the last frame on the recording medium 113.

Step S1109 is performed when the recording of frames in a shooting interval m−2 or an interval earlier than that is not yet completed. In step S1109, the system control unit 105 updates the last frame set in the image shake correction unit 108 with the last frame shot in the shooting interval m−1. The image shake correction unit 108 ends the recording operation after the completion of recording of the last frame set by the system control unit 105 on the recording medium 113.

In step S1110, the shake detection unit 205 acquires shake information in a composition changing interval, as in step S1102.

In step S1111, the system control unit 105 determines whether a shooting termination request has been issued by the user operating the operation unit 106. If the system control unit 105 determines that the shooting termination request has been issued (YES in step S1111), the processing proceeds to step S1116. In step S1116, the system control unit 105 sets an interval lasting until the shooting termination request has been issued as a composition changing interval n, and stores, into the RAM 111, the maximum shake amount within the composition changing interval n. Then, the processing proceeds to step S1117. If the system control unit 105 determines that no shooting termination request has been issued (NO in step S1111), the processing proceeds to step S1112.

In step S1112, the system control unit 105 determines whether a change in composition has ended due to the completion of the zoom operation, the completion of panning, or the like, via the composition change detection unit 207. If the system control unit 105 determines that the change in composition is continuing (NO in step S1112), the processing returns to step S1110, in which the system control unit 105 acquires shake information. If the system control unit 105 determines that the change in composition has ended (YES in step S1112), the processing proceeds to step S1113.

In step S1113, the system control unit 105 records, on the RAM 111, the maximum shake amount within the composition changing interval. In step S1114, the system control unit 105 adds "1" to the composition fixed interval n to obtain a composition fixed interval n+1 so as to set the next interval as an interval to be processed. Then, the processing returns to step S1102, in which the system control unit 105 acquires shake information within the composition fixed interval n+1.

In step S1117, the system control unit 105 generates a next interval as an interval to be processed, as in step S1105.

In step S1118, the system control unit 105 determines whether recording of all video signals obtained up to the recording interval m−1 on the recording medium 113 has been completed, as in step S1107. If the system control unit 105 determines that recording of all the video signals has been completed (YES in step S1118), the processing proceeds to step S1119. If the system control unit 105 determines that recording of all the video signals has not yet been completed (NO in step S1118), the processing proceeds to step S1120. At this time, the recording interval 0 is not present. Therefore, when the processing enters step S1118 for the first time, the processing proceeds to step S1119.

In step S1119, the system control unit 105 inputs, to the image shake correction unit 108, a video signal stored in the frame memory 109 for the shooting interval m−1, and starts recording the video signal subjected to image shake correction on the recording medium 113, as in step S1108.

In step S1120, the system control unit 105 updates the last frame set in the image shake correction unit 108 with the last frame shot in the shooting interval m−1.

In step S1121, the system control unit 105 determines whether the recording of all video signals on the recording medium 113 has been completed. If the system control unit 105 determines that the recording of all video signals has not yet been completed (NO in step S1121), the processing repeats step S1121, in which the system control unit 105 waits for the completion of recording. If the system control unit 105 determines that the recording of all video signals has been completed (YES in step S1121), the processing for shooting a moving image ends.

As described above, the video camera 100 once stores a shot video signal into the frame memory 109, and performs image shake correction after the angle of field in a composition fixed interval is determined. Accordingly, the present invention can apply to operations during shooting of a moving image.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2013-086626 filed Apr. 17, 2013 and No. 2014-033278 filed Feb. 24, 2014, which are hereby incorporated by reference herein in their entirety. This application also claims the benefit of Japanese Patent Application No. 2013-136165 filed Jun. 28, 2013.

What is claimed is:

1. A moving image processing apparatus comprising:
   a shake amount acquisition unit configured to acquire and output a shake amount;
   a period acquisition unit configured to acquire a period during which a change in composition occurs in a video image;
   a setting unit configured to set a size and position of a cut-out range of image data for each frame of the video image based on the shake amount output from the shake amount acquisition unit;
   a correction unit configured to change, based on the shake amount, the position of the cut-out range set by the setting unit in such a way as to correct shaking of the video image; and
   a change unit configured to change the size of the cut-out range set by the setting unit in the period during which a change in composition occurs acquired by the period acquisition unit,
   wherein the setting unit sets a size of a first cut-out range based on a maximum shake amount within a first image reading period and sets a size of a second cut-out range based on a maximum shake amount within a second image reading period, and
   wherein the change unit changes the size of the cut-out range from the first cut-out range to the second cut-out range in the period during which a change in composition occurs.

2. The moving image processing apparatus according to claim 1, further comprising a video reproduction unit configured to reproduce image data read out from the cut-out range as a video image,
   wherein the video reproduction unit includes a resolution conversion unit configured to process and enlarge image data read out from the first cut-out range at a first enlargement ratio to match an output video image size, and to process and enlarge image data read out from the second cut-out range at a second enlargement ratio to match the output video image size, and
   wherein the change unit does not change the size of the cut-out range when the second enlargement ratio is larger than the first enlargement ratio.

3. The moving image processing apparatus according to claim 1, wherein the change in composition of the video image includes at least one of a change in optical zoom, a change in electronic zoom, forward and backward movement of an imaging apparatus that captures the video image, panning, and tilting.

4. The moving image processing apparatus according to claim 1, further comprising a video reproduction unit configured to reproduce image data read out from the cut-out range as a video image,
   wherein the video reproduction unit includes a resolution conversion unit configured to process and enlarge image data read out from the cut-out range to match an output video image size, and a display unit configured to display the video image processed and enlarged by the resolution conversion unit.

5. The moving image processing apparatus according to claim 1, wherein the shake amount acquisition unit reads and acquires a shake amount obtained during shooting of the video image and stored together with the video image, or acquires, as the shake amount, a motion vector detected based on motions between frames of a video image reproduced from a recording medium.

6. The moving image processing apparatus according to claim 1, wherein the correction unit performs control such that the change in size of the cut-out range for correcting shaking of the video image is continuous with the change in composition of the video image.

7. The moving image processing apparatus according to claim 6, wherein the change unit changes the size of the cut-out range such that the change in composition of the video image and the change in size of the cut-out range for correcting shaking of the video image have the same rate of change or have respective rates of change the sum of which is zero.

8. The moving image processing apparatus according to claim 6,
   wherein the change unit changes the size of the cut-out range from the first cut-out range to the second cut-out range such that the change in size of the cut-out range is continuous with or included in the period during which a change in composition occurs.

9. The moving image processing apparatus according to claim 6, wherein the change unit changes the size of the cut-out range for correcting shaking of the video image before and after the change in composition of the video image when the change in composition of the video image and the change in size of the cut-out range for correcting shaking of the video image are in the same direction.

10. The moving image processing apparatus according to claim 6, wherein the change unit changes the size of the cut-out range for correcting shaking of the video image such that the change in composition of the video image is canceled at start or end of the change in composition of the video image when the change in composition of the video image and the change in size of the cut-out range for correcting shaking of the video image are in opposite directions.

11. An imaging apparatus comprising:
    an image sensor; and
    the moving image processing apparatus according to claim 1.

12. A moving image processing method comprising:
    acquiring a shake amount;
    acquiring a period during which a change in composition occurs in a video image;
    setting a size and position of a cut-out range of image data for each frame of the video image based on the shake amount output from the acquired shake amount;
    changing, based on the shake amount, the position of the set cut-out range in such a way as to correct shaking of the video image;
    changing the size of the cut-out range set by the setting in the acquired period during which a change in composition occurs acquired;
    setting a size of a first cut-out range based on a maximum shake amount within a first image reading period and sets a size of a second cut-out range based on a maximum shake amount within a second image reading period; and changing the size of the cut-out range from the first cut-out range to the second cut-out range in the period during which a change in composition occurs.

* * * * *